LINE MEMORY TYPEWRITER

Filed Dec. 6, 1952 9 Sheets-Sheet 1

INVENTOR.

Nathaniel B. Wales Jr

Jan. 18, 1955 N. B. WALES, JR 2,699,857

LINE MEMORY TYPEWRITER

Filed Dec. 6, 1952 9 Sheets-Sheet 2

INVENTOR.

Nathaniel B. Wales Jr.

Jan. 18, 1955 N. B. WALES, JR 2,699,857

LINE MEMORY TYPEWRITER

Filed Dec. 6, 1952 9 Sheets-Sheet 3

INVENTOR.

Nathaniel B. Wales jr

Jan. 18, 1955 N. B. WALES, JR 2,699,857

LINE MEMORY TYPEWRITER

Filed Dec. 6, 1952 9 Sheets-Sheet 4

INVENTOR.

Nathaniel B. Wales Jr

LINE MEMORY TYPEWRITER

Filed Dec. 6, 1952

9 Sheets-Sheet 5

INVENTOR.

Nathaniel B. Wales Jr

Jan. 18, 1955

N. B. WALES, JR 2,699,857

LINE MEMORY TYPEWRITER

Filed Dec. 6, 1952

9 Sheets-Sheet 6

INVENTOR

Nathaniel B. Wales Jr

Jan. 18, 1955 N. B. WALES, JR 2,699,857

LINE MEMORY TYPEWRITER

Filed Dec. 6, 1952 9 Sheets-Sheet 7

INVENTOR

Nathaniel B. Wales Jr.

INVENTOR

Nathaniel B. Wales Jr.

INVENTOR
Nathaniel B. Wales Jr

United States Patent Office 2,699,857

Patented Jan. 18, 1955

2,699,857

LINE MEMORY TYPEWRITER

Nathaniel B. Wales, Jr., Morristown, N. J., assignor to Industrial Patent Corporation, New York, N. Y.

Application December 6, 1952, Serial No. 324,500

13 Claims. (Cl. 197—1)

This invention relates to a typewriter in which a line of characters selected on a keyboard is stored in a memory device comprising a plurality of type drums, until a "print" key is actuated, thereby printing out the selected line of characters seriatim by a corresponding plurality of printing hammers.

The memory feature of this machine makes possible a novel system of automatic justification based on the information available before printing as to the width value of the selected characters. Justifying is accomplished by varying the spaces between certain of the words in the line.

A feature of my invention is a display window in which visible proof of the characters of the line appear as they are selected, but before they are printed. This makes possible erasure and correction of any error made in selection prior to the printing operation.

In addition to justification, this invention provides a novel means of variably spacing the printed characters in proportion to their individual typographical widths. Both justification and character spacing is accomplished by a carriage which moves the paper with respect to a row of coaxial adjacent type memory drums, but from left to right, in contradistinction to the right to left motion of a conventional typewriter carriage. The carriage of the subject invention thus moves only for space adjustment purposes and not to bring fresh paper into registration with a single printing station.

Another feature of this disclosure is a means whereby each type drum of the line memory device is made available for registering the selection of a new line substantially as soon as the printing operation of the given drum has been accomplished for the previous line. This makes possible an overlap of the printing and selection operations thereby minimizing the delay between completion of the selection of one line and the beginning of the next. Thus, one type memory device is made to perform two simultaneous functions.

There are twenty-nine basic elements in the preferred form of my invention. For convenience in analyzing the operation of the machine, they are listed below and each element designated by a number which identifies it as a whole throughout the following specification:

(1) Memory type drums
(2) Drum phasing device
(3) Stop fingers
(4) Proof window
(5) Printing hammers
(6) Carbon tape
(7) Carriage
(8) Column cam
(9) Release magnet
(10) Phase selecting commutators
(11) Keyboard
(12) Shift key
(13) Master pulser
(14) Justifier
(15) Print key
(16) Column cam reset
(17) Erase key
(18) Space value sensing cam
(19) Spacer
(20) Hammer cam
(21) Space senser
(22) Hammer lock
(23) Sequencer

(24) Carriage return
(25) Paper advance
(26) Tape advance
(27) Motor
(28) Left margin control (left margin spacer)
(29) Right margin control In the preferred embodiment of my invention, the memory type drums 1 comprise 80 parallel coaxial drums having metal die-cast rims each bearing 80 different type characters spaced around its periphery. Intervening between each type character is a depressed area bearing a visible character corresponding to that type character having a constant predetermined phase displacement therefrom. The periphery of each drum thus presents a profile approximating that of a gear. The width of each drum is approximately 5/32 inch, and the overall diameter 6⅜ inches.

Each drum is freely mounted on a central, continuously-rotating drive shaft which imparts a continuous torque thereto by means of a drum phasing device 2, comprising a permanent drag magnet extending along the axial length of the drive shaft and co-operating with a permanent torque magnet imbedded in each drum. In addition to the torque magnet, each drum is equipped with a centrifugal detent tending to precisely phase any drum, when rotating, with a common groove running the length of the drive shaft parallel to its axis.

The stop fingers 3 comprise 80 parallel shock-mounted levers pivoted on a common shaft parallel to the axis of the type drums. These levers are spring-biased so as, when released, to drop into the space between any two type teeth whereby to bring the corresponding type wheel to rest at a phase position determined by the phase instant of release.

A proof window 4 positioned in the outer case of the machine parallel to the type drum axis, is provided, through which the selected characters of the line are visibly displayed for those drums which have been brought to rest by the stop fingers.

A plurality of 80 spring-biased printing hammers 5 is aligned in a fixed frame running along the printing line position parallel to the type drum axis and closely adjacent to the periphery of these drums. This frame is supported by a bridge member at one end.

Intervening between the printing hammers and the type drum peripheries, there is positioned a carbon printing tape 6.

The paper is carried by pressure rollers secured to a carriage 7 having a track behind and parallel to the printing hammer frame, so that the paper circuit passes between the hammer faces and the carbon tape in front of the type drums.

Of the two factors required to release a given stop finger, the column cam 8 comprises the first, and consists of a cylindrical cam parallel to the stop finger axis. This cam has a protuberant land spirally disposed around the cylinder in such a way that where the protuberance contacts the stop fingers. it disables their ability to drop into, and thus stop, their respective drums. The protuberance embraces 10 fingers at a time, so that for each 1/80 revolution of this column cam, one finger on the left is enabled to drop into its drum, and simultaneously, the tenth finger removed therefrom on the right is cammed out of contact with its drum, thereby releasing it for rotation under the drag of its magnet. The rotation of the column cam is effected by torque supplied by a slip clutch under control of a magnetically-actuated escapement.

The second factor required for release of a stop finger to drop into, and thus stop, its drum, is a single elongated release electromagnet 9 running the width of the drums behind the fingers and so designed that when energized it can restrain any stop finger from dropping into its drum even if released by the column cam. The distance-force design of this magnet is such that once having released a stop finger by de-energization to drop into its drum, it is powerless to retract it until the column cam mechanically restores the stop finger into control proximity to this common electromagnet.

The phase selecting commutator drum 10 has 40 commutator rings corresponding to the 40 keys of the keyboard and is geared at a 2-to-1 ratio to the type drum drive shaft, so that the commutator makes one complete revolution for each specific ½ revolution of the type memory drums. This permits any of the 80 characters on the drums to be selected by means of the 40 keys of the keyboard through the use of a shift circuit. For a given ½ revolution of the type drums, each of the 40 commutator rings has an electric gap at a phase position corresponding to the registration with the printing line of a particular different type character in that half.

The keyboard 11 consists of a group of 40 spring-loaded switches arranged in a standard typewriter configuration. Depression of a key enables the corresponding phase selecting commutator to release the next stop finger made eligible for release by the column cam, at the instant required to stop the given type drum at the desired position. It is required that the key complete its downward stroke before the column cam is permitted to advance to its next escapement position.

The shift key system 12 consists of a commutator having ½ insulation and ½ contact area, and secured to the type drum drive shaft. One of two brushes 180° apart is selected by the shift key switch so as to disable one or the other alternate rotations of the phase-selecting commutator corresponding to the lower case or the upper case characters on the type drums, respectively.

Also mounted on the type drum drive shaft is an electrical master pulser commutator 13 having 80 gaps corresponding to the 80 teeth of the drums. The brush acting on this commutator serves to generate accurately phased negative pulses for releasing the stop finger magnet, thus compensating for any phase inaccuracy introduced by the 40 phase-selector commutator brushes or by the intervening gearing.

The justifier 14 consists of two identical memory devices which are used alternately for each successive line in order to permit the overlap of printing and selection operations. Each memory device consists, in a commercial machine, of a 400 tooth ratchet wheel and four separate magnetic ratchet lever solenoids and pawls corresponding to the four possible type widths provided, namely, $\frac{2}{32}$, $\frac{3}{32}$, $\frac{4}{32}$, and $\frac{5}{32}$ inch (ranging from "i" to "M"). In addition, a $\frac{1}{32}$ inch spacing width is provided for purposes of justification. Thus, the maximum value of type width would be $80 \times \frac{5}{32} = \frac{400}{32}$ inch. On the depression of any key on the keyboard, the ratchet solenoid corresponding to the typographical width of that character is energized, thereby integrating on the justifier memory the width value of the type selected in the given line. Provision is made to re-route the return key circuits for the correct width values corresponding to the shift position. For a full width margin ($\frac{400}{32}$ inch) the deficit between the selected integrated width units and 400 units represents the amount of width justification required at the moment of actuation of the "print key." Means are provided to assimilate this deficit by additionally spacing each of the spaces between words as the memorized line is sequentially printed out by the multiple hammers until this deficit is used up. Thereafter, normal spaces are given between words for the remainder of the line. It is to be noted that no provision is made to count the spaces in the composed line. This method of justification is based on the observation that the average number of spaces between words in a typewritten line is approximately 8 spaces, which allows a justification of $\frac{16}{32}$ or ½ inch, if an additional 2 spaces is interjected at each space to consume the justification deficit. Provision is also made to shift the justification interjection to 1 unit for the last justification increment if the 2 unit interjection would cause "over-justification" of the deficit. If three unit justification increments are employed, a total of ¾" justification becomes available, and the shift to 1 unit justification increments is made during the last two remaining units. Each justifier memory is provided with a zero reset magnet to clear its memory at the completion of justification for a given line, or on operation of the print key. This novel two-stage method of justification does not include any device for counting spaces, but instead dispenses with the complicated computing devices required to spread the justification over the whole number of spaces. This feature makes possible a simple practical machine.

The print key 15 actuates a lock-in relay which simultaneously performs the following operations:

*a*. Shifts justifier memories.

*b*. Zeroes column cam.
*c*. Connects pulsing circuit to sensing cam escapement.
*d*. Disables keyboard control of column escapement.
*e*. Turns off green keyboard pilot light and disables erase key.

The column cam resets 16 is a lever system and solenoid which on actuation disengages the column cam escapement and introduces a stop lever to rapidly position this cam to its home or zero position.

The erase key 17 is arranged to actuate the column cam reset device twice so as to clear the memory line entirely. This key also operates the reset device on the active justifier memory.

Since the printing is done seriatim on the memorized type drums, it is necessary to generate information after each print hammer has operated as to the space value of the letter just printed, so that the carriage may be moved an appropriate amount to compensate for this width. This information is extracted from the stationary type drums by a space value sensing cam 18 which at the appropriate time, in sequence, advances one of a plurality of sensing fingers which moves inward radially between each pair of adjacent type drums until it contacts a die-cast pin so positioned as to permit a displacement of the sensing finger proportional to the space value of the character in register with the printing line. In addition to the four possible values of typographical width, there is also provided a fifth position (the innermost) which identifies the selected registration of a space with the printing line. The limiting displacement of each sensing finger is caused to select one of five spacing electrical circuits. The sensing cam then energizes these selected circuits in sequence along the row of sensing fingers in alternation with the actuation of the printing hammers. The movement of the sensing cam is effected by torque from a slip clutch under control of a solenoid-actuated escapement.

The carriage is spring biased to move from left to right. It is restrained from this motion by the spacer 19 which comprises an electromechanical device which permits the carriage to jump forward 1, 2, 3, 4 or 5 units of spacing ($\frac{1}{32}$ inch) according to which of five input circuits are energized. (This is in addition to a constant machine spacing.)

The hammer cam 20, in rotation, progressively cocks and releases the bias springs of each printing hammer in synchronized alternation with the sensing and spacing operations. This cam is positively geared in 1:1 relation to the sensing cam, and thus is controlled in movement by the sensing cam escapement solenoid.

When the sensing fingers encounter a displacement indicating a "space" registration for a given drum, an auxiliary circuit is closed in addition to the space value circuit allocated to "spaces." These two circuits are designated as the space senser 21. When the space senser circuit recognizes a space, it "interrogates" the justifier as to whether to cause the spacer to insert a normal or an extra value of carriage displacement. The answer to this query comprises the routing which the justifier gives the interrogation pulse on its way to the spacer.

When the auxiliary space senser circuit is closed, it actuates the hammer lock 22 which is a solenoid-actuated bar which mechanically prevents any hammer from reaching the paper even when its spring-loaded hammer is released. This prevents smudging the copy at the spaces, and is an important part of this invention to make possible multiple hammer operation.

The sequencer 23 is an electrical programming commutator driven by the sensing cam shaft and arranged to perform the following operations in sequence:

(*a*) Enables column cam escapement.
(*b*) Feeds 10 impulses to column escapement in synchronization with operation of first 10 characters printed out.
(*c*) Enables release magnet.
(*d*) Momentarily opens "space" keyboard selector circuit.
(*e*) Enables keyboard control of column cam.
(*f*) After last hammer has been released:
   1. Zeroes justifier (if not already zeroed).
   2. Opens sensing cam escapement pulsing circuit.
   3. Actuates line advance solenoid.
   4. Energizes carriage return.
   5. Energizes tape advance.
   6. Unlocks "print" relay.

The carriage return 24 comprises a magnetic clutch for coupling the motor to a means for moving the carriage to the left until it arrives at an adjustable limit switch, whereupon it declutches the motor.

The paper advance 25 comprises a solenoid-driven ratchet mounted on the carriage for rotating the paper feed rollers by a predetermined adjustable amount.

The tape advance 26 employs a magnetic clutch and limit switch to advance the carbon tape the width of the type drums at the completion of each printing cycle.

The motor 27 runs continuously in operation, and is coupled as follows:

*a.* Directly to the phasing commutators 10.
*b.* By a 2/1 step-down gear to the drum phaser 2.
*c.* By slip clutch to the column cam 8.
*d.* By slip clutch to the sensing cam 18.
*e.* By magnetic clutch to the carriage return 24.
*f.* By magnetic clutch to the tape advance 26.

The left margin control 28 comprises the adjustable limit switch of the carriage return mechanism. There is also provided a special left margin space key which inserts space registrations on any of the left-hand drums but does not actuate the space senser, thus permitting tabular insets whose left-hand margin will be even. Without this feature the action of the justifier could make uneven left-hand margins for tabular insets.

The right-hand margin control 29 consists of an adjustment of the position of those contacts on the two justifier memories which signal the achievement of justification. Thus, for a narrower right-hand margin, justification would be completed in less than 400/32 inch of type width. Provision is made to disable the keyboard when the reset of the justifier indicates that the right-hand margin has been reached.

Since all the control operations of the machine are effected by electrical circuits, it becomes possible to connect a plurality of such machines together for slave operations by a single master keyboard.

The objects of this invention are to provide a novel typewriter design having the following characteristics:

*a.* Automatic justification
*b.* Visible proof of a line before printing
*c.* Ability to erase errors before printing
*d.* Automatic variable spacing of characters
*e.* Minimum of mechanical parts
*f.* Overlap of selection and printing operations
*g.* Entirely electrical control of machine to permit multiple slave machine operation
*h.* Use of carriage for space adjustments only
*i.* Absence of any space counting device or calculator for justification
*j.* Use of a unitary drum member for memory, visible proof display, character selection, type font and spacing control
*k.* Means to disable printing hammers registering with typographical spaces Other objects are implicit in the accompanying specification and claims.

Figure 4:
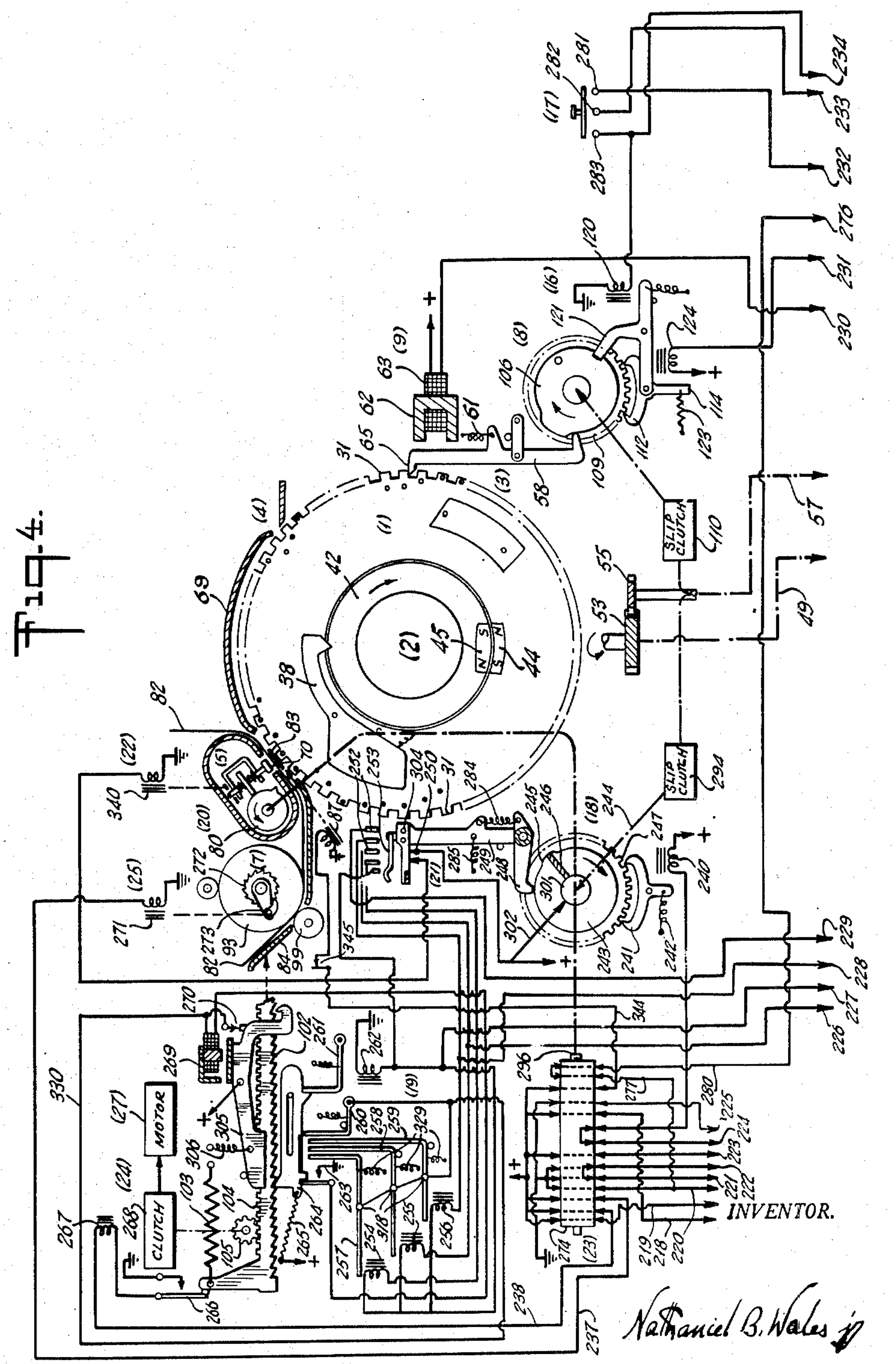
Figure 5:
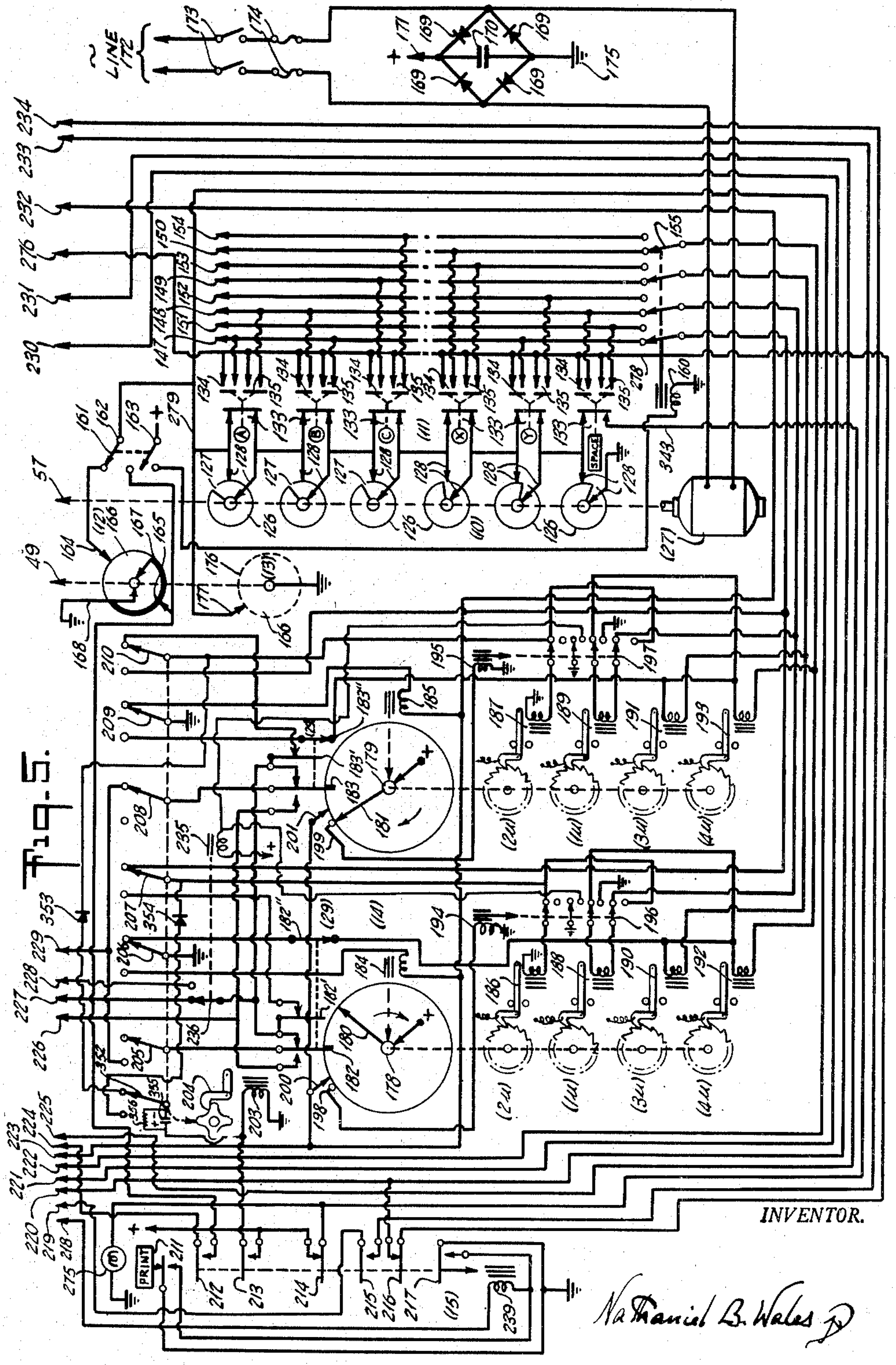

Figs. 4 and 5 together form an electro-mechanical schematic diagram depicting the detailed electrical connections between all the mechanical parts of the machine.

Figures 6, 7:
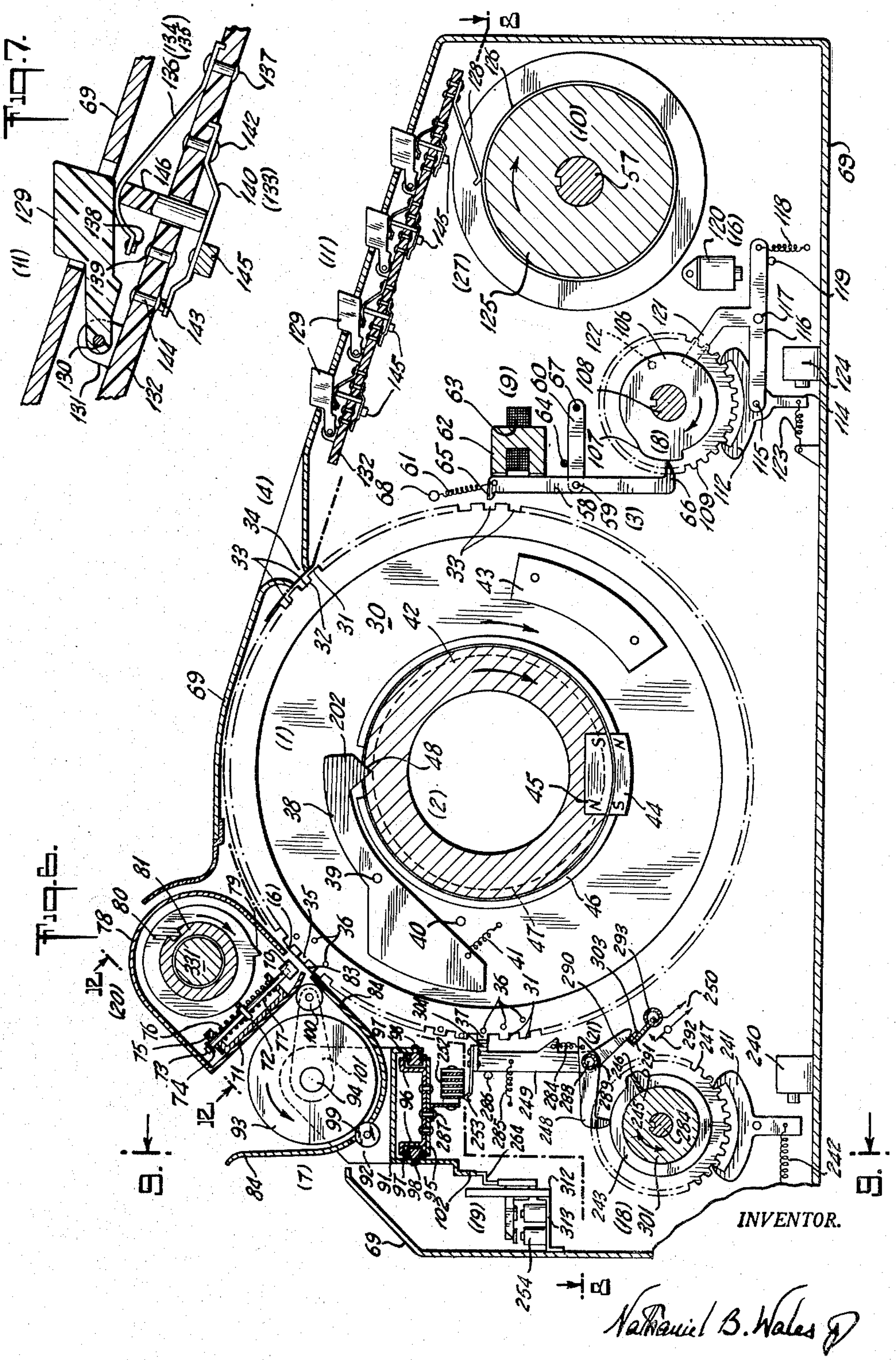

Fig. 6 is a section in elevation through the preferred form of the typewriter, showing one of the type memory drums with its attendant mechanism and the electrical printed circuit keyboard with its associated commutator drum.

Fig. 7 is an enlarged view of part of Fig. 6 showing the details of a key switch.

Figure 8:
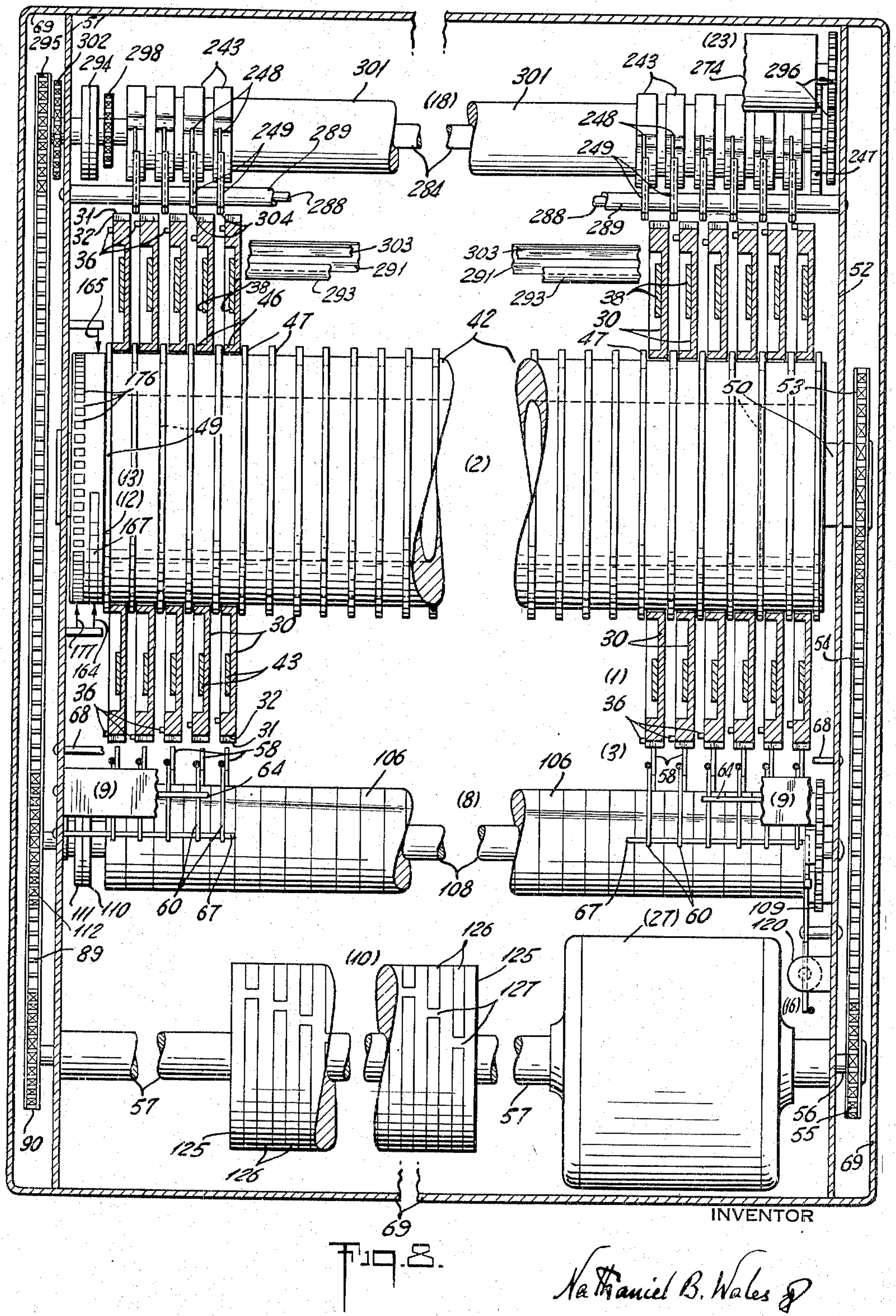

Fig. 8 is a plan view in part through 8—8 of Fig. 6 showing the parallel arrangement of some representative type drums with their associated stop fingers and space value sensing levers.

Figure 9:
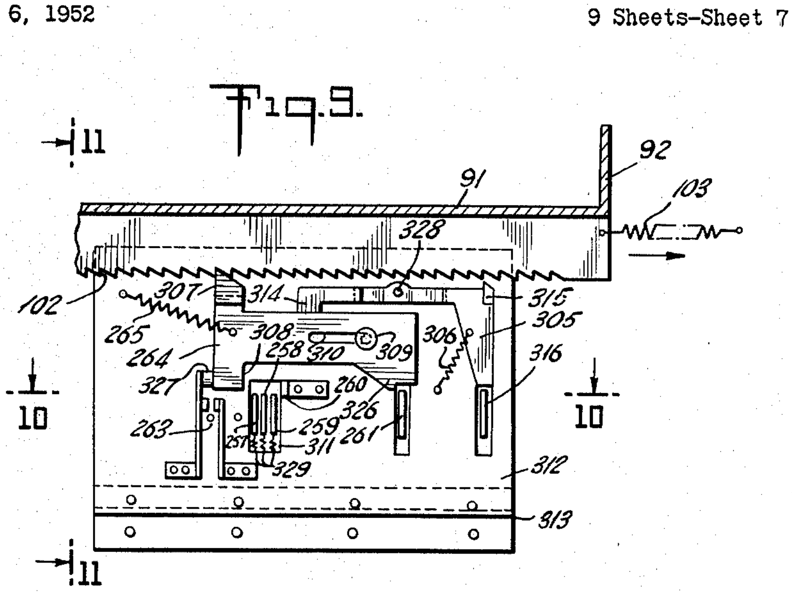

Fig. 9 is an enlarged view through 9—9 of Fig. 6 showing the mechanical design of the spacing device.

Figure 10:
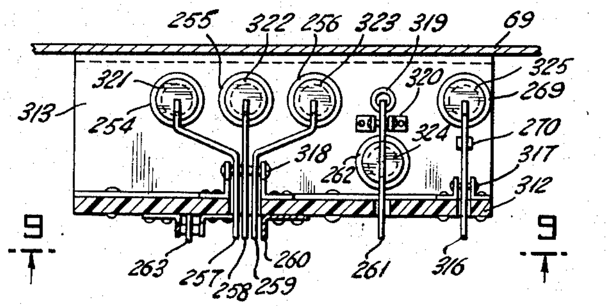

Fig. 10 is a section through 10—10 of Fig. 9.

Figure 11:
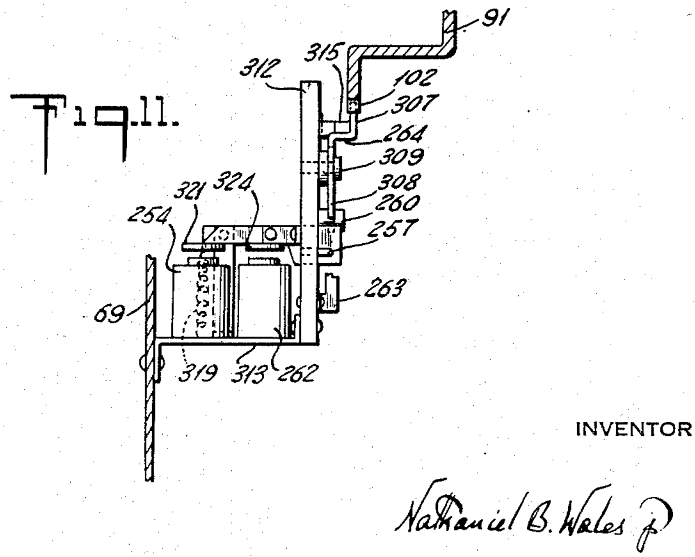

Fig. 11 is a section through 11—11 of Fig. 9.

Figure 12:
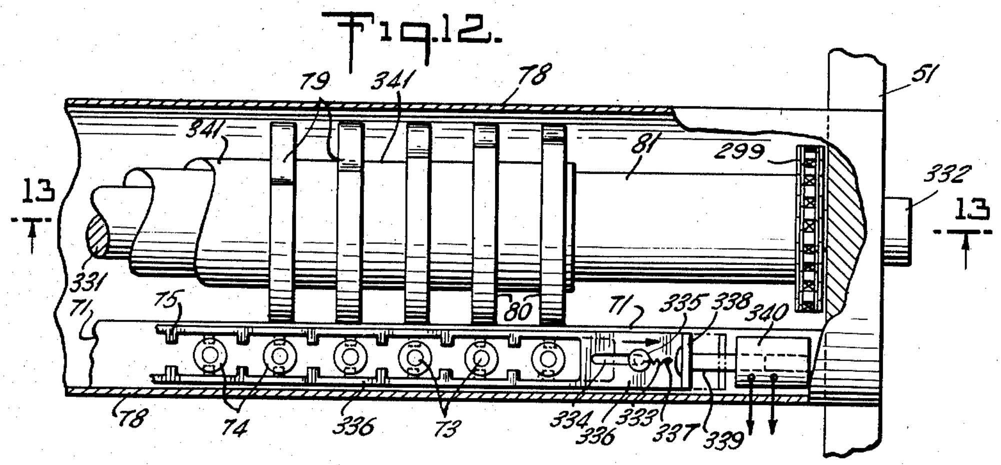

Fig. 12 is an enlarged section through 12—12 of Fig. 6 showing the hammer lock mechanism.

Figures 13, 14:
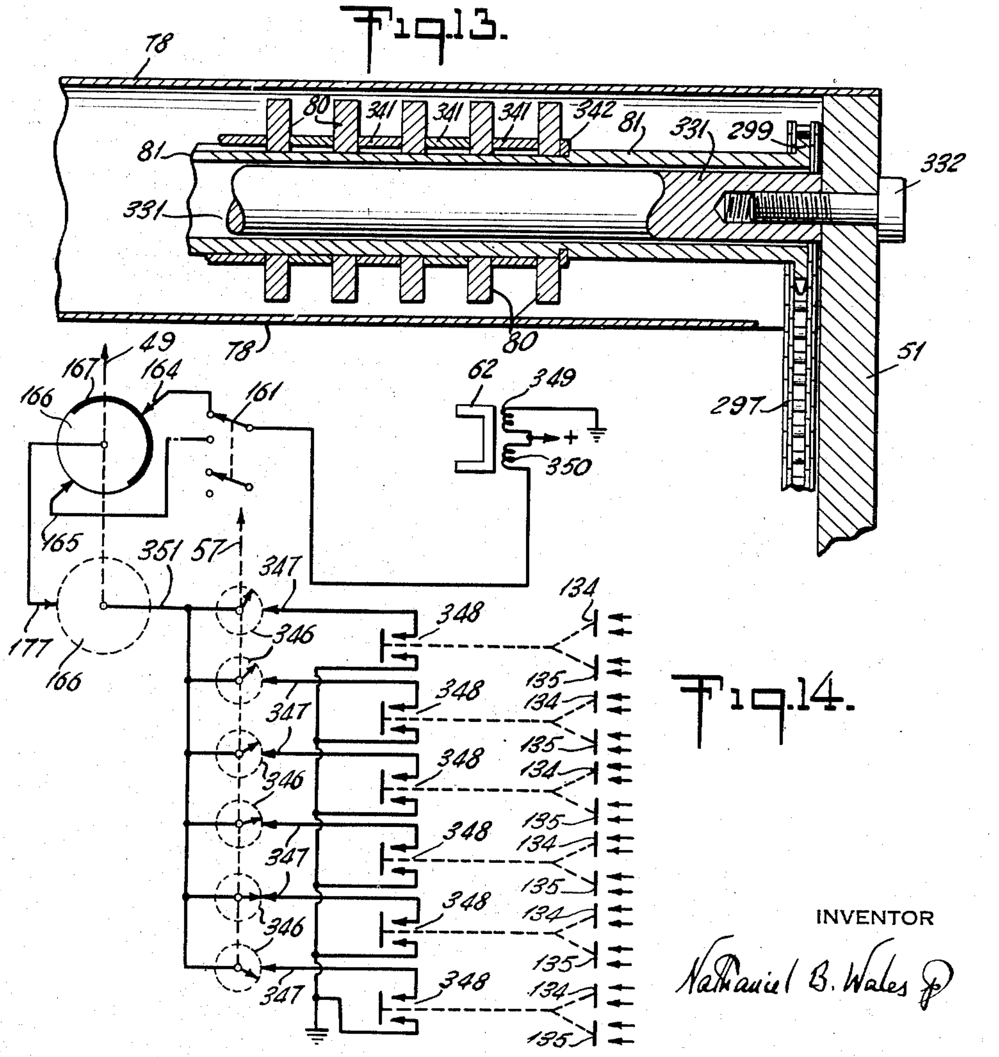

Fig. 13 is a section through 13—13 of Fig. 12.

Fig. 14 is the schematic diagram of an alternative form of the commutator phase selection circuit using opposing windings in the release magnet, thereby permitting the use of positive pulses.

Figure 15:
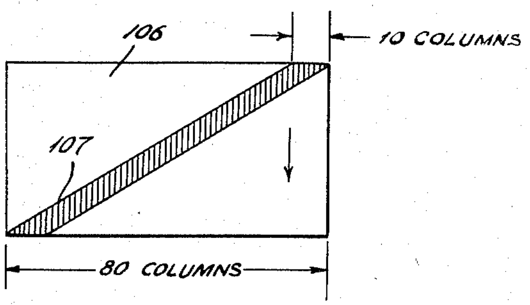

Fig. 15 is a diagram showing the evolved contour of the column cam.

Figure 16:
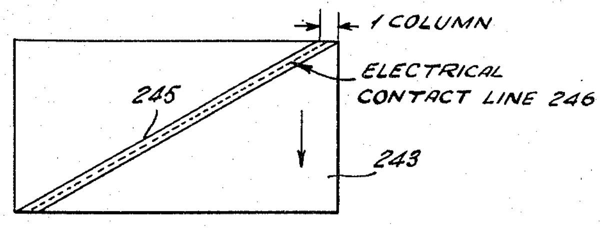

Fig. 16 is a diagram showing the evolved contour of the space value sensing cam.

Figure 17:
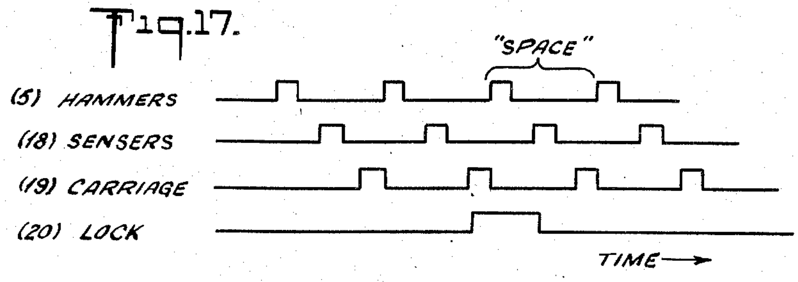

Fig. 17 is a sequence diagram showing the time relations between operation of the print hammers, sensing levers and spacing mechanism.

Figure 18:
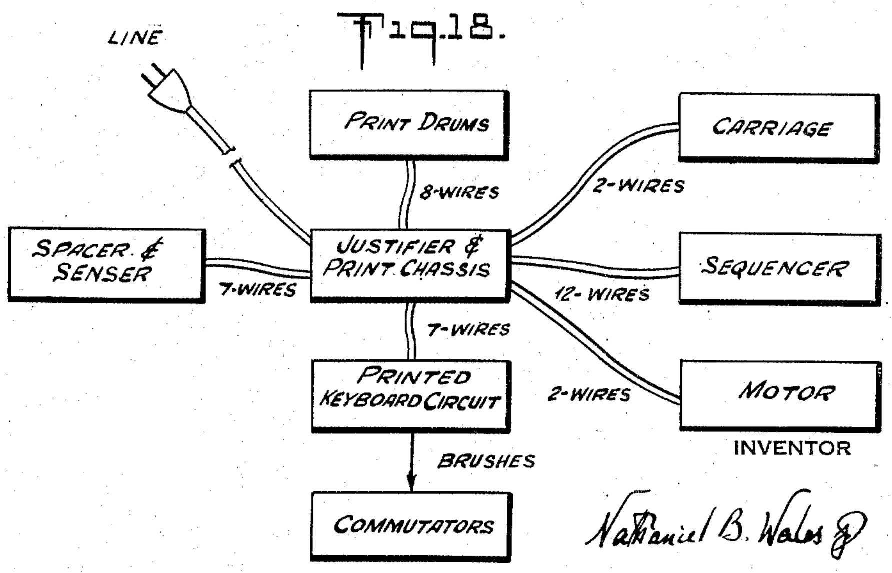

Fig. 18 is a block diagram showing the electrical cable connections between the fabricated sub-assemblies of the machine.

It is to be noted that throughout the disclosed machine, four spacing positions only, corresponding to 1, 2, 3 and 4 units of spacing are shown to simplify the drawings. However, in a practical machine, five positions are desirable, as previously described. The extension of this mechanism and circuit to five positions will be clear to those skilled in the art. Of the four positions shown, the 2, 3, and 4 unit spacings are devoted to three typographical widths, whereas the 1 unit spacing position is used for justifying purposes only.

(1) *Memory type drums*

Referring to Figs. 6 and 8, numeral 30 refers to one of the 80 identical type memory drums each bearing (in a preferred embodiment) 80 type characters 31 on its periphery. Intervening between each type character 31 is a radially depressed area 32 bearing a visible character representation 33. Integrally fixed to one side of the outer portion of the rim of each type drum 30 are the space value pins 36, each corresponding to a specific type character 31. The radial position of each pin 36 corresponds to one of the three typographical spacings provided. The type position corresponding to the selection of "space" on the keyboard has a special pin 36 in a fourth radial position which is innermost of the four positions provided. There is a constant angular displacement between each pin 36 and its corresponding character 31 equal to the angular displacement between the printing line position 35 and the sensing finger position 37 as seen in Fig. 6. Similarly, there is a constant angular phase displacement between each type face 31 and its corresponding visible character representation 33 equal to the angle between the proof window position 32 and the printing line position 35 as seen in Fig. 6.

Each type drum 30 is provided with a centrifugal detent lever 38 pivoted on a stud 39 secured to the recessed portion of drum 30. When the drum is at rest, spring 41 moves lever 38 into contact with stop pin 40, thereby disengaging detent pawl 202 integral with lever 38 out of engagement with drive shaft 42. During rotation of drum 30 above a critical speed, centrifugal force acts on the heavier portion of lever 38 near spring 41 to overcome the latter and tend to engage detent pawl 202 with the drive shaft 42. A counterweight 43 is provided on each drum 30 to maintain balance in the dynamic condition of phased rotation.

A permanent drag magnet 44 is secured to the inner periphery of each drum 30 so as to conform to the bearing surface of the hub 46 of each drum 30.

(2) *Drum phasing device*

All 80 drums 30 are journalled on drive shaft 42 and separated from one another by the non-magnetic snap rings 47 seated in parallel grooves cut in shaft 42. A longitudinal permanent magnet 45 is imbedded in a groove cut in shaft 42 parallel to its axis. As shaft 42 rotates, it tends to drag drums 30 with it by the action of magnet 45 on magnets 44. Further, this torque tends to phase drums 30 to a definite phase relationship. Precise mechanical phasing of the drums 30 to shaft 42 is completed by the centrifugal action of detent 202 on a corresponding V-shaped groove 48 cut in shaft 42 parallel to its axis. Thus, drums 30 may be spoken of as having impositive phasing means to rotate the drums in constant common phase relation to said phasing means. The phasing drive shaft 42 is provided with hubs 49 and 50 secured to its ends and journalled in side plates 51 and 52 respectively. A drive sprocket 53 secured to the outer projection of hub 50, and a chain 54, connect the phasing drive shaft 42 to one motor shaft 56 via drive sprocket 55 at a 1-to-2 ratio so that shaft 42 rotates one-half as fast as motor 27.

(3) *Stop fingers*

The stop finger system 3 consists of steel stop finger levers 58 each bearing a stop pawl 65 at the upper end and a cam finger 66 at the lower end. Levers 58 are each pivoted on studs 59 secured to a separate shock lever 60 which is in turn pivoted on the common fixed shaft 67 which forms the bearing for all 80 levers 60. Each stop lever 58 is provided with a bias spring 61 which tends to pull pawl 65 into engagement with the type teeth 31—32 of its corresponding drum 30, and at the same time tends to keep each shock lever 60 in contact with the common fixed stop rod 64. The stop fingers 58 may each be restrained from engagement with drums 30 either by the action of cam 8 or by magnet 9.

(4) *Proof window*

The outer case of the machine 69 is provided with a window aperture 34 which registers with a depressed area of any drum 30, when it is stopped with any type face 31 in registration with the printing line position 35. The visible type representations 33 visible through window 34 thus spell out (in unjustified form) the composition of the selected line of type.

(5) *Printing hammers*

The printing hammers 70 are secured to the ends of rods 73 slidably mounted on U frame 71. Each hammer rod 73 has secured to it a central collar 72 which is acted on by the two opposing springs 76 and 77 so as to bias it to a neutral position. Collar 72 is engaged by cam tooth 79 on rotation of hammer cam 80, thereby compressing spring 76. On passing the point of disengagement between tooth 79 and collar 72, the hammer 70 is driven forward to impact the paper against the carbon tape 83 and type face 31 at the printing position 35. Spring 77 then returns the hammer 70 to the neutral position. A second stop collar 74 is secured to the end of each printing hammer rod 73. When the hammer lock bar 75 is in the locked position, it places a stop member so as to interfere with the printing trajectory of collar 74, thereby preventing the hammer 70 from reaching the paper even though collar 72 has been released by tooth 79. Frame 71 and cams 80 are enclosed in the metal case 78 running the width of the machine and supported at the left end, as seen by the operator, by an extended portion of the machine chassis 51.

(6) *Carbon tape*

The carbon tape 83 (see Figs. 1, 2, 4 and 6) passes adjacent to the type drums 30 under the lip 84 of carriage 7 in front of the printing hammers 70. It is stored in conventional bobbins indicated by housings 85. Guide members 84′ at each side of the machine position and lead the tape between its printing position and the housings 85.

(7) *Carriage*

The carriage consists of the U-shaped chassis 91 to which are secured end plates 92 which form the journals for the shaft 94 of paper roller 93, and for the pressure idler roller 99. Paper guide 84 is also secured to end plates 92. A secondary feed roller 100 is supported at its ends by levers 101. Gearing means, not shown, couple rollers 93 and 100 together so that their peripheral feed speeds are identical and in the same direction. This permits short forms and envelopes to be handled in this novel geometry of printing paper circuit. Carriage chassis 91 is provided with rollers 97 journalled on studs 98 whereby to slidably constrain the carriage for motion parallel to the axis of drums 30 on track members 95 and 96 which are secured to the end chassis plates 51 and 52. Spring means 103 (Figs. 4 and 9) are provided to bias the carriage so as to urge it from left to right as seen by the typist. Linear spacing escapement teeth 102 are cut in the lower skirt of carriage chassis 91 for co-operation with the spacing mechanism 19. The carriage frame 91 also carries the rack member 104, shown schematically in Fig. 4, engaging a drive pinion 105 operated by the carriage return mechanism 24.

(8) *Column cam and reset* (16)

The column cam body 106 carries a spirally disposed land 107 which bears against stop lever fingers 66 when in registration therewith, thereby camming them about pivot 59 out of registration with the depressed drum teeth 32 and into registration with the release magnet pole piece 62. Cam 106 is keyed onto shaft 108 which is journalled by end plates 51 and 52. The right hand end of shaft 108 is secured to escapement wheel 109, while its left hand end is secured to driven slip clutch plate 110 co-operating with driving slip clutch plate 111 which is in turn driven by chain 89 via sprocket 112. The escapement mechanism for column cam 106 consists of escapement pallet lever 112 integral with magnetic armature 114 pivoted by stud 115 on disengagement lever 116. Lever 116 is journalled on fixed stud 117 and biased by spring 118 to a home position against stop pin 119. On energization of column reset magnet 120, stop arm 121 integral with lever 116 is advanced into interference with the rotary path of stop pin 122 secured to cam 106. At the same time, such energization of magnet 120 disengages escapement lever 112 from control of wheel 109, thereby permitting cam 106 under torque supplied by slip clutch 110—111 to rotate into a home or "zero" position as determined by the abutment of pin 122 with stop lever 121. On de-energization of magnet 120, stop arm 121 is withdrawn from contact with pin 122 and escapement lever 112 is re-engaged with escapement wheel 109. Escapement magnet 124 must first be energized, thereby overcoming bias spring 123 to attract armature 114, and then subsequently de-energized before a unit tooth of wheel 109 is permitted to advance under the torque supplied by slip clutch 110—111. There are eighty such teeth corresponding to the eighty columns provided in this embodiment of my invention. The protuberant spiral land 107 is shown in its developed form in Fig. 15. It may be seen that the width of land 107 is such as to engage ten adjacent stop lever fingers 66 at a time. Consequently, for each impulse delivered to magnet 124, the leftmost of the ten fingers 66 will be mechanically released, while the finger 66 to the right of the group of ten engaged fingers, heretofore mechanically free, will be engaged by the advancing land 107 whereby to cam it out of engagement with its drum 30, and into mechanical contact with the release magnet 62.

(9) *Release magnet*

The U-shaped magnetic circuit 62 of release magnet system 9 runs the width of the memory drums and so is in a position to magnetically restrain any stop finger lever 58 which is in contact with it from dropping into engagement with its corresponding memory drum 30 under the urgings of springs 61. The electromagnet field 62 is provided with a field winding 63, also following an elongated path extending the width of the drums 30, which when energized restrains the fingers 58 as above noted, but which on disconnection of its current source very rapidly releases whichever lever 58 is mechanically free to move away from it. Normally, there will only be one such free finger at a given instant of de-energization since all but one of the fingers 58 to the left of the ten finger-wide engagement area of land 107 will have been previously released to "remember" copy of the line being written, whereas the fingers 58 to the right of this advancing ten-lever "island" will still be registering copy of the previously composed line. Evidently, the only drums in rotation or in the process of being angularly accelerated up to full velocity of phased rotation with drive shaft 42 will be those drums whose stop fingers 58 are being mechanically or magnetically restrained. The space of ten drums was chosen to provide enough time for the phasing operation to take place at the highest expected rate of typing. This feature of erasing only a portion of the previous line memory as needed makes possible an overlap of the recording and printing functions, thereby affording a great overall economy in the fabrication of the machine, since without this duality, two entire memory systems would be needed if substantially continuous typing is to be achieved.

As will be elaborated later, the only delay presented to the typist in my machine is that of approximately one second in which the first ten characters of the composed line are printed out and the column cam 106 is caused to advance ten columns only, step by step after each of the first ten characters is printed, and thereafter stop, although the rest of character printing continues to completion without interruption. Consequently, by the time the keyboard is re-enabled, the first ten characters of the previously composed line have been erased, and the typist may start composing the next line during the completion of automatic printing of the previous line. This automatic rate of printing is designed to be sufficiently rapid (15 characters per second) so that the typist cannot "catch up" with the stationary drums representing the previous line, before their memories have been given up to the printing operation.

(10) *Phase selecting commutators*

The phase selecting system consists of the commutator drum 125 bearing on it forty insulated contact rings 126, each having a gap 127 located at one of forty corresponding equally-spaced angular phase positions around the periphery of the drum. Drum 125 is carried on and positively driven by motor shaft 57. It therefore rotates at twice the angular speed of the memory drum phasing shaft 42, and is made to have an exact predetermined phase relation to the phasing groove 48 of shaft 42. Each ring 126 is contacted by two of the brushes 128, so that connection between each pair is broken only at the short time interval corresponding to the passage of a gap 127 under the given pair of brushes 128. Each pair of brushes 128 corresponding to a ring 126 is electrically connected in parallel to a normally closed switch controlled by a corresponding key on the keyboard. These parallel circuits are then connected in series with each other, and with the release magnet 63. This series-parallel circuit is connected to a direct current power supply in such a way that the release magnet is normally energized. When a key is depressed, the commutator ring which the key-switch was shorting is enabled to break the magnet circuit at the phase instant when the selected character is about to register with the printing line position. The release of the one mechanically unconstrained stop finger 58 available by this de-energization of magnet 62—63 at any given position of column cam 106 will cause it to drop into the corresponding space 32, and the drum 30 will be brought to rest. The deceleration of the drum is accomplished smoothly by the lever-spring arrangement 58—60—61 which spreads the deceleration over an appreciable angle of rotation, and yet brings the selected registration into a precise alignment by returning lever 60 into contact with fixed stop 64. The finite but small time required for collapse of the magnetic field of magnet 62, and for movement of finger 65 through the small distance necessary to intercept a type tooth, comprises a constant time lag for all identical stop fingers. This lag is compensated by introducing a predetermined phase lead between the phases of shaft 42 and of shaft 57 (or by the phasing of contact 177).

(11) *Keyboard*

Mechanically, the keyboard consists of forty identical plastic key levers 129 pivoted on pins 130 which are journalled into support members 131 secured to the insulating keyboard plate 132. Keys 129 protrude through apertures in machine case 69. Each key operates a normally closed S. P. S. T. switch 133 and two normally open S. P. S. T. switches 134 and 135. The normally closed switch 133 consists of leaf 140 secured to plate 132 by rivet 142, contact point 143 secured to leaf 140, and contact rivet 144 also mounted on plate 132. In Fig. 7 one of the two normally open switches 134—135 may be seen to comprise leaf 136 riveted to plate 132 by rivet 137, contact point 138 secured to leaf 136, and contact rivet 139 mounted on plate 132. The insulating push member 146 couples the motion of leaves 136 and 140. Since all the switch connections terminate in contact areas on both sides of insulating plate 132, great ease of manufacture of the keyboard circuit will result from the use of printed circuit techniques.

The function of switches 133 is to enable their corresponding commutator ring 126, by unshorting it, to open the magnet 62 circuit at the right time to stop a drum 30 at the right character. Since the machine is designed to operate at the rate of fifteen characters per second, it is necessary that drums 30 rotate at least 15 R. P. S. or 900 R. P. M. Also, it is necessary that contacts 133 remain open at least $\frac{1}{15}$ second total downward and upward motion to guarantee that gap 127 has passed under brushes 128 in this interval. As a means of guaranteeing this interval, each normally closed switch leaf 140 is provided with an inertial mass member 145 riveted thereto. Thus, although the downward stroke of key 129 is under control of the operator, the return stroke will be determined by the design of spring rate and the predetermined mass 145, thus insuring proper registration of a memory pulse.

The column cam escapement 109, which determines in which column a character memory is next to be registered, in order to advance to the next column requires that a selection key 129 be not only depressed far enough to make contact on switches 134 and 135, but the key must also be released. This is accomplished by causing the closure of one of the switches 134 or 135 to energize the escapement magnet 124, thereby cocking spring 123, and then by opening switch 134 or 135 to allow spring 123 to complete the cam advancement. Thus, the above stipulated cycle of switching must be performed before cam 106 can advance to the next column.

Switches 134 and 135, besides actuating escapement magnet 124, correspond to the lower and upper case values respectively of the selected characters, and have the mission of conveying information to the active justifier memory as to the character width value associated with the lower case or upper case width of each key as selected by the shift key 161. Thus switches 134 are returned through circuits 147, 148, 149 or 150 corresponding to lower case typographical character widths of 2 units, 1 unit, 3 units or 4 units respectively, whereas switches 135 are returned through circuits 151, 152, 153 or 154 corresponding to upper case widths of 2, 1, 3 or 4 units respectively. Relay 160, operated by the shift key 161, also mounted on the keyboard, selects by the four pole double throw contacts 155, which of the two groups of return leads will be used, namely those corresponding to switches 134 or those corresponding to switches 135.

Lead 278 is the common return circuit of switches 134 and 135. This lead normally returns to the + side of the power supply through magnet 124 via switch 216 and lead 231.

Further manufacturing simplicity is achieved by mounting the forty pairs of commutator brushes 128 directly on keyboard plate 132. In this manner, the entire keyboard network of connections may be made by a single printed circuit operation.

In addition to the above keys, the keyboard is also provided with the following key switches: off-on, erase, line advance, 2 unit space, 3 unit space, non-justifying space, multiple space, and print.

(12) *Shift key*

The shift key system is based on the split commutator ring 167 which occupies 180° of the periphery of insulating commutator drum 166 which in turn is mounted with fixed phase with respect to phasing groove 48 on shaft 42. Two brushes 164 and 165 are mounted so as to contact drum 166 at points 180° apart, so that at any instant only one or the other of these brushes has electrical access to contact segment 167. Segment 167 is constantly grounded by lead 168.

The power supply, seen in the schematic diagram of Fig. 5, comprises full wave rectifier 169 and smoothing capacitor 170 connected to the alternating current line 172 through off-on switch 173 and fuses 174. The return of this direct current source is through the ground circuit 175. The "hot" or ungrounded side 171 of the power supply is designated in the drawings by "+."

The upper pole 162 of shift key 161 selects which of brushes 164 or 165 is connected to the top lead 279 of the series keyboard switches 133. The result of this connection is that when the selected brush is in contact with segment 167 and thereby grounded, the keyboard switches 133 are disabled from releasing any stop finger 58. For this reason, operation of the shift key selects whether the upper case 180° of drums 30, or the lower case 180° of drums 30, will be made available for selection by the operation of any key. Simultaneously with the selective action of pole 162 of shift switch 161, pole 163 either energizes or de-energizes relay 160, thereby selecting the appropriate group of width value circuits leading from the keyboard to the justifier memories.

(13) *Master pulser*

The master pulser system is based on the grounded chopper commutator segments 176 mounted on insulating drum 166 adjacent to the shift segment 167. The fixed precision brush 177 is phased in such a way as to produce grounding pulses precisely related to the instants at which the type characters register with the printing line. These multiple grounding pulses are exactly 4.5° apart for an eighty-character type drum and have a pulse length of 2.25° rotation. Brush 177 is connected to the top lead 279 of the series of keyboard switches 133 so that these pulses are superimposed on any pulses arising from the selector commutators 126. For this reason, the pulse width of gaps 127 may be made, say, 3° wide, thereby permitting wider manufacturing tolerances in the precision of the chain drive 54, and in the alignment of brushes 128.

(14) *Justifier*

The structure and operation of the justifier may be seen in the schematic diagram of Figs. 4 and 5. The justifying system 14 is based on two identical electromagnet-driven ratchet stepping relays 178 and 179. The even numbers from 178 to 200 relate to the left-hand stepping relay, whereas the odd numbers from 179 to 201 relate to the identically corresponding parts of the right-hand stepping relay. For this reason, description of one will suffice for both. The stepping relay 178 has 320 positions corresponding to the maximum of 80 characters per line having maximum 4 unit width each. (In a machine providing maximum 5 unit widths, there would be 400 teeth.) Four ratchet drive magnet mechanisms 186, 188, 190 and 192 are provided, each of which on energization can independently advance the switch arms 80 by 2, 1, 3 or 4 teeth, respectively. These magnets are connected into the return circuits, in the position shown, of the four switch arms 155, corresponding to 2, 1, 3 or 4 unit characters as chosen on the keyboard. Thus, depression of a key having a 3 unit typographical width will energize magnet drive 190, thereby advancing switch arm 180 three teeth displacement in a clockwise position. The home position of arm 180 is biased by a torque spring (not shown) so as to be in mechanical contact (but not electrical) with switch leaf 182. Thus, in the home position, arm 180 forces the three pole switch 182—182′—182″ into its alternative position, that is, movement of arm 182 moves all three poles to their opposite position. A release solenoid 184 is provided to disengage, when energized, a conventional ratchet holding pawl so as to allow arm 180 to return to its home position.

At any time during the composition of a line, the position of arm 180 thus represents the integrated number of type width units, including normal spaces, used in that composition. Therefore, the number of ratchet teeth displacements required, in addition to the integrated number at the given point in the line, to bring finger 180 into registration with the 320th tooth, represents the deficit in spacing width which must be introduced at enough of the word spaces to equal this deficit when the memorized line is printed out.

My invention achieves this justification in a simple way and without calculation of the ratio of the above deficit to the number of spaces, by the following novel method. By examination of a large volume of representative typewritten business correspondence and commercial copy, it has been observed that at least eight word spaces will occur statistically in an average typewritten line. It has further been observed that the average typist produces copy which is unjustified by no more than 16 to 20 space units. Combining these observations, it thus becomes evident that my invention makes it possible to make a simplified statistically successful justifier which ignores the number of word spaces in a line (in contradistinction to U. S. Patent No. 2,379,862 devoted to specifically word space counting), but which simply introduces an average of two extra space units into each typographical space as it occurs, until the justification deficit is used up, and thereafter introduces only normal spaces for the remainder of the line. Under the scope of the invention, it is equally feasible to introduce a greater increment than two at the first few word spaces, and automatically reduce the increment progressively until the deficit is used up.

In order to incorporate this simplified method of justification and still permit overlap in the operations of composition and printing, two independent space width counters 178 and 179 are provided, and a ratchet switch 204 is provided which on the actuation of the print key 211 shifts the output from the keyboard relay 155 to the alternative justifier memory. Simultaneously, the memory which has been adding widths from the composition of a line on the keyboard (in this case, 178) is disconnected from the keyboard and connected to the space senser 21 via wire 229 so that, as each typographical space is encountered in the sequence of character printing, the justifier arm 180 will advance clockwise by two units representing the two additional space units contributed towards absorbing the deficit beyond the normal two unit typographical space. Coincident with this registration of justification increment on arm 180, the spacing mechanism is given a pulse over wire 227 which causes the carriage to move to the right four units of width before the next character is printed. This process of deficit absorption continues until arm 180 hits the 320th ratchet tooth, representing justification, thereby applying the hot + side of the D. C. power supply to contact 200 and energizing reset solenoid 184 (only) and returning arm 180 to its home position where it moves switch 182—182′—182″ to the opposite position to that shown. This latter action is the signal that enough additional space has been added to the unknown number of spaces in the line so that if any subsequent spaces occur in the line, the insertion of a normal space value (2 units) therein will produce a justified line. The circuit shown accomplishes this object by causing any subsequent pulses coming from the space senser 21 via wire 229 to be routed by switch 182 to lead 226 corresponding to a two unit spacing of spacer 19. These additional spaces after justification is accomplished, however, are disabled from further stepping arm 180, since the movement of switch 182′ disconnects the lead passing via switch 207 to either magnet 186 or 188.

Since the numerical value of space units representing the deficit at the time the print key is actuated may be any number less than 320, it is possible that, if the number is odd, the addition of a final increment of two units could overjustify the line. To prevent this situation, contact 198 is provided at a position one tooth removed before the 320th tooth, or justified, position. When the integrating stepping finger 180 falls on this contact, it energizes relay 194 which shifts its four pole double throw switch 196 into the alternative position to that shown. This results in the next space registering one step on arm 180 by impressing the pulse from lead 229 on magnet 188 instead of the usual unjustified actuation of magnet 186. This additional step then resets arm 180 to the home position as before. Coincident with this actuation of relay 194 due to contact between arm 180 and contact 198, one of the contact arms of switch 196 is made to energize relay 235 which then throws switch 236 the opposite position to that shown. This action reroutes the next impulse (only) coming from space senser lead 229 to lead 228 corresponding to a three unit spacing of spacer 19. This action completes justification, as before, and any subsequent spaces experienced by lead 229 will be directly routed by switch 182 to the two unit spacing lead 226. The operation of space value memory 179 is the reverse to that of 178. That is, while counter 178 is totaling space from the keyboard, counter 179 is justifying the printing of the previous line, and vice-versa. This shift is accomplished by the ratchet relay 204 which on each energization of its magnet 203 by closure of switch 213 of the print lock-in relay 239 shifts all the switches 352, 205, 206, 207, 208, 209 and 210 to the opposite position simultaneously. As can be deduced from the foregoing, the function of each switch is as follows: Switches 205 and 208 determine which memory, 178 or 179, will receive impulses from the space sensing lead 229. Switches 206 and 209 determine which set of ratchet pawls will be enabled to respond to pulses coming from the keyboard relay 155. Finally, switches 207 and 210 route the impulses coming from the justifying switches 182′ or 183′ to the appropriate increment ratchet 186 or 187 (188 or 189 when relay 194 or 195 is energized). The purpose of switch 352 is to introduce a constant initial displacement of two space units on whichever justifier memory 178 or 179 is in the act of shifting from the justifying operation to the keyboard integrating operation at the instant switch 213 energizes ratchet relay 203—

204. This is necessary because at the said moment of shifting, the above identified memory has its switch 182″ or 183″ open, and without the above constant initial displacement no impulses from the keyboard could register on the newly activated memory. These two initial units are compensated for by the physical positioning of contacts 198, 200, 199, 201 (i. e., there are actually 322 teeth in ratchets 178 and 181). The rectifiers 353 and 354 allow the pulse from switch 213 to actuate either magnet 186 or 187, but prevent any keyboard pulses to these magnets from affecting ratchet relay 203. Condenser 355 and resistor 356 serve to allow the charging current of condenser 355 to actuate the magnet 186 in the position of switch 352 shown, when 203 is energized, but prevents the subsequent actuation of magnet 187 when said switch reaches its opposite position, due to the polarity of charge shown and the action of rectifier 353. The time constant of the parallel combination 356—355 is such as to restore the system to its original uncharged condition at the next actuation of the print key.

(15) *Print key*

The print key 211 is a normally open S. P. S. T. switch which on actuation energizes lock-in relay coil 239, thereby operating the six pole S. T. switches 212 to 217. Normally open switch 217, on closing, locks in coil 239 to ground. The hot + supply for coil 239 is via lead 218 and the corresponding sequencer 23 connection to the + power lead. Just prior to the completion of the sequencer cycle, lead 218 is momentarily opened, thereby unlocking relay 239. As noted, switch 213 shifts the justifier space memories by means of ratchet switch 204.

Switch 215 operates the column cam reset device 16 by energizing magnet 120 via leads 234 and sequencer lead 219. As soon as the sequencer starts, it opens this circuit, thereby re-engaging 112 with 109 and permitting the sequencer subsequently to operate the escapement magnet 124.

Switch 212 connects the intermittent grounding pulses available at brush 165 to the escapement magnet 240 of the space value sensing cam 18 through the sequencer lead 224. Consequently, as soon as the print key relay 239 locks in, pulses from brush 165 begin rotating cam 243 and the sequencer drum 274 which is geared 1:1 with cam 243. This progressive escapement of rotors 243 and 274 (together with cam 80) continues until, at the completion of the printing cycle, sequencer contact lead 224 is opened, thereby stopping further escapement.

Switch 214 opens when relay 239 locks in, thereby removing + power from erase key 17 via lead 233. Switch 216 disconnects the keyboard return lead 278 from connection with column cam escapement magnet 124 via lead 231 so that the keyboard is effectively disabled during the printing out of the first ten characters. After this amount of printing, even though the printing process continues, manual control of the keyboard is returned by the sequencer connections 220, 277, 280 and 276, which result in shorting out switch 216 for the remainder of the sequencer program.

Recapitulating the print key relay circuits and their functions:

Switch 212 delivers pulses to sequencer (165 to 224 to 240).
Switch 213 shifts justifier memories (relay 203).
Switch 214 opens pilot light 275 and erase circuit 233.
Switch 215 zeroes column cam (lead 234).
Switch 216 disables keyboard (lead 278).
Switch 217 locks in print relay 239.

(17) *Erase key*

Contact 281 of erase key 17 goes via lead 232 to justifier reset magnets 185 and 184. However, only one of these magnets corresponding to the particular "active" memory connected to the keyboard by either switch 206 or 209 has a ground return. Contact 283 connects to the column cam reset magnet 120, and contact 282 goes via lead 233 to the + side of the power supply through normally closed disabling switch 216.

Consequently, when key 17 is closed, thereby connecting together contacts 281, 282 and 283, the column cam 106 is zeroed to its home position and the active justifier memory is similarly zeroed.

One actuation of key 17 (unless the column cam happens to be at its home position) will only cam those stop fingers 58 into engagement with magnet 62 which lie to the right of the last drum memorized. Consequently, to clear the drums fully, it is either necessary to actuate key 17 twice, or alternatively, switching means may be built into the mechanism of key 17 to close and open contacts 282 and 283 twice automatically on a single actuation. The above operation of the erase key results in the disengagement of all stop fingers 58 and the consequent rotation of all drums 30, thereby re-establishing the initial conditions for line composition, without the necessity of printing the erased line.

(18) *Space value sensing cam*

Referring to Figs. 2, 4, 6 and 8, the space value sensing cam comprises shaft 284 journalled in the side plates 51 and 52 carrying insulated sleeve 301 secured to it. Mounted on sleeve 301 are 80 insulating cam surfaces 243, each having a protuberant land 245. Within the surface area of each land is a conductive surface 246 which is electrically connected to insulated sleeve 301 so that all contact surfaces 246 are externally electrically available to brush 302. The phase of each land 245 is progressively staggered from its adjacent land through 4½° displacements so that as the cam 243 is rotated about its shaft 284, the row of 80 co-operating cam followers 248 are progressively lifted and then electrically contacted. Shaft 284 has a constant torque imposed on it by slip clutch 294 driven by sprocket 295 and chain 89. An escapement wheel 247 having 80 positions is secured to shaft 284 and acted on by escapement lever 241 with bias spring 242 and escapement magnet 240, so that each pulse impressed on magnet 240 causes cams 243 to advance 1/80 revolution under the torque of slip clutch 294.

The cam following levers 248 each bear on one cam 243 and perform both mechanical and electrical functions. Each lever 248 is freely mounted on insulating sleeve 289 supported on shaft 288 which is secured to end plates 51 and 52. Adjacent to each lever 248 mounted freely on sleeve 289 and electrically and mechanically connected to levers 248 by springs 284 are the sensing levers 249. Each sensing lever 249 is provided with an insulated spring 285 which normally keeps lever 249 seated against insulated stop 286. The plane of each sensing lever 249 lies in the space between each pair of adjacent drums 30 so that rotation of any lever 249, as seen clockwise in Fig. 6, about axis 288 will cause the sensing finger 304 of lever 249 to move radially inward between two adjacent drums 30 until it contacts one of the type width value pins 36. Each lever 249 carries brush contactor 253 mounted on one end so that clockwise rotation of lever 249 about axis 288 causes brush 253 to move progressively from one to the next of the mutually insulated contact bus bars 252 which run the width of the machine and are secured to the support member 95 by bracket 287. At the lower end of each lever 249 there is an integral finger 290. These fingers 290 move in an arc which intersects insulating bar 303 so that for a predetermined amount of displacement (corresponding to the sensing of a space) lever 291, on which bar 303 is mounted, is displaced about its spindle 293 sufficiently to contact insulated contact point 292. This space sensing switch is designated 250. The "space" displacement of any finger 290 will close switch 250. For convenience of draughting, switch 250 is shown in a different schematic form in Fig. 4 than the mechanical form shown in Figs. 6 and 8.

The operation of the space sensing system is as follows: When the print key 15 is actuated, pulses from contact 165 are applied to magnet 240, and cams 243 begin to advance clockwise step by step. At each step, one finger 248 is lifted, thereby extending spring 284 which is designed to overcome spring 285. For this reason, sensing finger 249 snaps forward to a degree of displacement determined by the radial position of the particular pin 36 which has registered with it. Since this pin has been positioned on drum 30 to define the typographical space width value of the type character 31 which is aligned with the printing position 35, the contact brush 253 will terminate on one of the five contact bars 252 corresponding to the equivalent spacing circuit. At the completion of this mechanical switching selection, lever 248 encounters the contact area 246 which thus pulses the selected bar 252 with the + side of the power supply via brush means 302. Bars 252, in Fig. 4, reading left to right correspond to four units, one unit, two units, three units, and typographical space, respectively. Except for the space connection 229, these bars 252 are directly connected to the magnets 262, 254, 255 and 256, respectively, of the spacer 19. Consequently, as each drum 30 is sensed by finger 304, the carriage 7 is caused to move from left to right, as seen by the typist, by the typographically indicated amount at the instant electrical contact is made between contact area 246 and cam finger 248 for each sensing finger in turn. The evolved equivalent cam of protuberances 245 and contacts 246 is shown diagrammatically in Fig. 16.

(19) *Spacer*

The spacer may be seen diagrammatically in Fig. 4, and mechanically in Figs. 6, 9, 10 and 11. The spacer is assembled on a chassis bracket 313 secured to the rear case of the machine 69, and on the insulating plate 312 secured to chassis 313. The principal member of the spacer is the dog or slider plate 264 which is slidably secured to plate 313 by stud 309 riding in slot 310 pierced in slider 264. The diagonal spring 265 serves both to make electrical connection with the slider 264 and to bias the engagement finger 307 integral with slider 264 so that it is urged upward into engagement with the linear spacing ratchet teeth 102 cut into the carriage chassis 91. Spring 265 also tends to return slider 264 to its home position at the extremity of slot 310, as shown in Fig. 9. The carriage return spring 103 is designed to overpower return spring 265 so that as soon as slider 264 is released by the restraining lever 261 acting on catch 326 integral with 264, the carriage will move from left to right, as seen in Fig. 9, carrying the plate 264 with it. This engaged pair 102 and 264 will continue to move until the tab 308 of lever 264 hits any one of levers 257, 258 or 259, or until it abuts against fixed stop 260. The intersection of tab 308 with these potential stops corresponds to 1, 2, 3 or 4 units of typographical spacing respectively.

It is to be noted at this point that the carriage must move between each printing hammer blow not only a distance to compensate between the maximum width of the drums 30 and the given typographical width, but also a constant amount, in addition, equal to the physical separation of the drums. This is designed to be an even number of width units wide, say 2 units. If the chosen unit is $\frac{1}{32}$ inch, this means that whether compensation is required from a typographical standpoint or not, the carriage must move at least this fixed $\frac{1}{16}$ inch between each hammer blow. This constant addition is introduced by the design of the spacing between the home position of tab 308 and the plane of the first stop lever 257. A row of 5 unit capital "M's" for instance, being the widest character, needs no typographical adjustment, but the carriage must move the $\frac{1}{16}$ inch regardless between the printing of each "M." On the other hand, a row of 2 unit "i's" requires an adjustment of (5–2) or 3 units for each printing, consequently, in this case the carriage would move (3+2) units or $\frac{5}{32}$ inch between each printing to compensate both typographically and for the inherent space between the drums 30 required for the operation of fingers 304. The reason the carriage moves in opposition to the conventional carriage is because the type drums are already spaced. Consequently, in order to "close ranks" between characters, the paper must be carried in the direction of the sequence of advance. In contradistinction to this, a conventional typewriter, having only one printing station, must carry the paper from right to left, any width adjustment being subtracted from the maximum unit of right to left spacing.

Levers 257, 258 and 259 are pivoted on rod 318 secured to plate 312, and are provided with magnetic armatures 321, 322 and 323 respectively. The three electromagnets 254, 255 and 256 are adapted to attract the foregoing respective armatures so that energization of any one magnet will raise one of the three corresponding levers into a position which will intersect the sliding path of tab 308. Springs 329 normally retract levers 257, 258 and 259 from the path of tab 308 so that in the absence of excitation of any of these three, but on the actuation of the release lever 261 alone, the tab 308 and carriage 91 will move down to stop 260 (representing 4 units spacing). Lever 261 is provided with pivot 320, bias spring 319, armature 324 and magnet 262. The circuit embracing the four magnets is such that if magnet 254, 255 or 256 is energized, it also simultaneously energizes release magnet 262. On the other hand, magnet 262 may be energized alone for four unit spacing.

Electrical contact from the + side of the power supply to slider 264 is maintained through spring 265. Consequently, when lug 308 contacts any lever 257, 258, 259 or stop 260, all of which are electrically connected together, magnet 269 is energized. The latter magnet is provided with an armature 325, a pivot 317 and an actuating lever 316, together with a lock-in contact 270. When magnet 269 is energized, lever 316 forces reset lever 305 to move counterclockwise about pivot 328 (Fig. 9) against spring 306 whereby first to engage lock finger 315 integral with lever 305 with the carriage teeth 102, and secondly to cause lug 314 also integral with lever 305 to overcome the upward component of spring 265, thus disengaging slider 264 from engagement with teeth 102, and permitting spring 265 to return slider 264 along slot 310 to the home position of Fig. 9. Switch 263 is forced open when slider 264 is in its home position but is closed for any position of slider 264 displaced to the right away from home. Since switch 263 forms the electrical ground return for magnet 269, this magnet can be energized at any position of slider 264 away from home. For this reason, contact between tab 308 and any of the stop members will put + current on lead 330, thereby energizing magnet 269 and disengaging finger 307 from the carriage teeth 102. As soon as lever 316 completes its stroke, the lock-in contact 270 closes, thus making the continued excitation of magnet 269 no longer dependent on current through lead 330. For this reason, lever 305 will continue to lock the carriage by finger 315 and allow the return of slider 264 under the force of spring 265 until slider 264 reaches its home position, thereby opening contacts 263 and unlocking magnet 269 to complete one spacing cycle. These events, of course, take place in a very small fraction of a second.

It is to be noted that in contradistinction to the prior art of variable spacers, the construction just described uses a single dog 264 which is permitted to travel variable distances, in place of the more complicated arrangement in which a plurality of dogs having different fixed travels are selectively enabled to move with the carriage (or an element connected to it) while the others are disabled. (cf. U. S. Patent No. 2,385,035).

(20) *Hammer cam and lock* (22)

Referring to Figs. 2, 6, 12 and 13, the hammer cam mechanism may be seen to comprise fixed spindle 331 secured to an extension of side chassis plate 51 by bolt 332. Rotatably journalled on spindle 331 is hammer cam drive sleeve 81 on which are keyed the eighty hammer cams 80 spaced apart by spacer sleeves 341 and longitudinally constrained at each end by snap rings 342. The cam tooth 79 on each cam is phased so as to form a progressive evenly pitched spiral around the hub 81. As seen by the typist, the left-hand end of sleeve 81 carries a sprocket 299 driven by chain 297 which is in turn driven from sprocket 298 carried on the space value sensing cam shaft 284. Consequently, the cam teeth 79 have an exact predetermined phase relation to the cam protuberances 245 and contact areas 246 on sensing cam 243 so as to produce the phase sequence of operations illustrated in Fig. 17.

The hammer frame 71 is secured to the casing 78 and to the end plate 51. The hammer lock yoke 336 is slidably mounted on frame 71, by studs 335 sliding in slots 334. Spring 337 connected between stud 335, attached to frame 71, and stud 337, secured to slide 336, biases the latter to the left of its slot travel, as seen in Fig. 12. The inwardly projecting tabs 75 integral with slide member 336 are adapted to slide to the dotted position under the snap ring collars 74 on hammer rods 73 whereby to stop the stroke of hammers 70 before they can strike the paper 82. The slide 336 can be actuated into this locking position by energization of solenoid 340 which attracts armature 339 which is secured to tab 338 integral with slide 336.

Referring to Figs. 4 and 17, it may be seen that as soon as a sensing finger 249 encounters a space registration in the sequence of printing out, it closes switch 250 thereby locking the hammers as above described at the phase overlap indicated in Fig. 17. This disabling of the printing hammers from impacting the paper at spaces prevents the otherwise unavoidable smudging of the unconstrained paper either by inertial forces or by actual contact with the drums 30.

(21) *The space senser*

This system includes switch 250 which is actuated as above described, and the innermost (right) contact of the bus bars 252 which terminates in lead 229. When a "+" current pulse coming via brush 302, contact 246, cam follower 248, spring 284, sensing lever 249, brush 253, is delivered through the space bar 252 to lead 229, it "interrogates" the justifier as to what space to generate, and the justifier "answers" by presenting to this pulse a path through switches 205 or 208, 182 or 183, and one of the output contacts of switch 236, which results in the pulse being delivered to one of leads 226, 227 or 228, corresponding to spacing commands for 2, 4, or 3 unit spaces, respectively, according as the output justifier memory is justified, unjustified, or one unit from justification respectively.

(23) *Sequencer*

The sequencer drum 274 has fourteen contact rings which are appropriately interrupted or interconnected, so that when rotation of this drum is begun by the escapement magnet 240 at the closure of print key 211, the following connections are made:

*a.* Lead 219 is removed from + thereby disconnecting current to reset magnet 120 which had been applied by switch 215 of the print relay 239.

*b.* Applies ten pulses to magnet 124 via leads 220 and 231 (220=231) after each of the first ten printing hammer releases. During these column cam advance pulses, the release magnet 63 is maintained energized via lead 221 and 230 (221=230) by grounding it, thus removing its control from the keyboard.

*c.* The jumper between 221 and 222 is restored and 221 is ungrounded thus giving control of the magnet 63 release back to the keyboard.

*d.* Momentarily opens "space" connection 343 from keyboard via lead 225 which is normally grounded. This memorizes "space" registration on all the remaining drums 30 in the line which were as yet unselected by the keyboard at the moment the print key was actuated. Further, the delay interval provided by the sequencer rotation after column cam zeroing by the print key switch 215, permits the remaining drums 30 to come up to phased speed so that the subsequent opening of lead 225 will insure correct stopping of these remaining drums at the "space" position.

*e.* Restores manual control of keyboard by connecting 277 to 280.

*f.* At the finish of the printing cycle the sequencer performs the following final circuit operations:

1. Zeroes justifier by pulsing lead 223=232 with + current.
2. Opens sensing cam pulses to escapement magnet by opening lead 224 to magnet 240.
3. Actuates solenoid 271 via lead 237 to advance paper feed.
4. Energizes magnet 267 via lead 238 thereby initiating carriage return.
5. Energizes magnet 87 via lead 344 thereby initiating carbon tape advance.
6. Unlocks print relay coil 239 via lead 218. This action enables erase key (17) and re-energizes pilot light 275.
7. Opens lead 224 thereby stopping the sequencer 274 and cams 243 and 80.

(24) *Carriage return and left margin control* (28)

This mechanism includes rack 104 (Fig. 4), pinion 105, clutch 268, clutch-actuating solenoid 267, and the limit switch 266. After being energized by sequencer connection 238, the power from the motor via shaft 57, chains 89 and 302, and clutch 268, drives the carriage from right to left until limit switch 266 is opened. Due to the ratchet nature of finger 307 of the spacer 19 the slider 264 automatically disengages from teeth 102 during this operation. The position of limit switch 266 may be manually shifted with respect to the carriage bed 95—96 so as to comprise a left margin control device.

(25) *Paper advance and tape advance* (26)

Roller 93 is equipped with a ratchet 272 and arm 273 whose throw may be adjusted for single, double, or triple line spacing. This ratchet is actuated by solenoid 271 when lead 237 is pulsed by the sequencer drum 274 at the end of the printing cycle. It is to be noted from an engineering standpoint that this solenoid is the only one in the machine required to be a prime mover. All other magnets in the machine either perform instrumental operations or act to control the release of mechanical power from motor 27. The use of a solenoid 271 for this purpose was shown for schematic convenience. It may be substituted by a device mechanically responsive to the carriage return.

The tape 83 is advanced by a drive including chain 89, sprocket 88, clutch 86, clutch solenoid 87, and limit switch 345 arranged by a mechanism (not shown) to meter out a length of tape equal to a line of type at each actuation by the sequencer via lead 344.

(29) *Right margin control*

The function of switches 182'' and 183'' is to disable the keyboard from registering any more characters when the active justifier memory reaches the end of its capacity as determined by the position of contact 200 or 201. This is accomplished by virtue of the fact that when arm 180 or 181 reaches contact 200 or 201, respectively, it is zeroed by magnet 184 or 185 thereby opening either switch 182'' or 183''. This results in opening the ground return of all the active stepping magnets (186, 188, 190, 192) or (187, 189, 191, 193).

The right margin control consists of a knob whereby the positions of all the contacts 200, 198, 201, 199 are simultaneously shifted relative to ratchet arms 180 and 179 so as to determine the total number of space width units which will constitute justification. In this case, the maximum number of units is 320, so that movement of the above contacts can reduce the total number of unit steps to any desired whole number value below 320.

*Operation*

Figure 1:
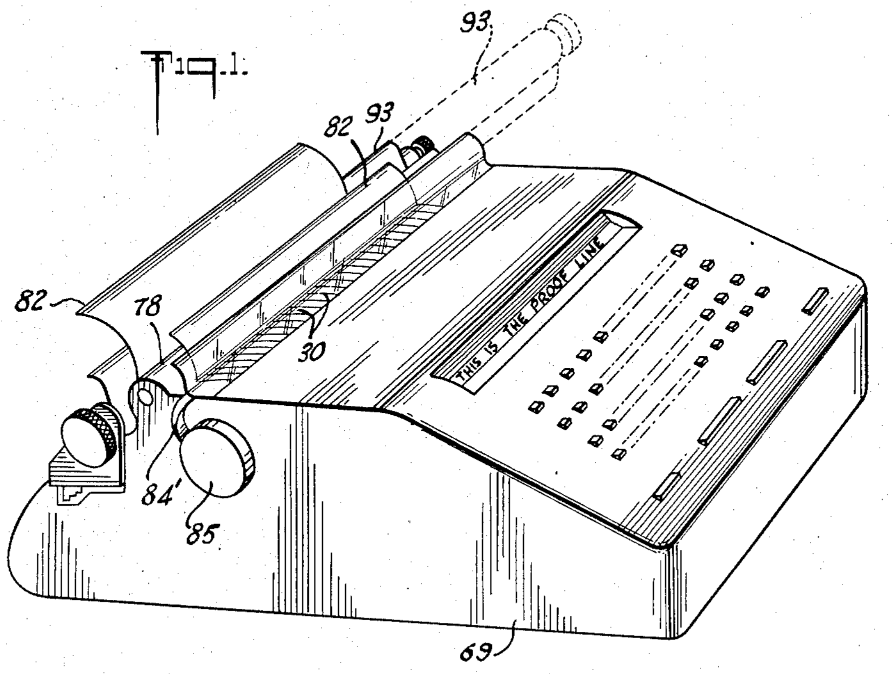
Fig. 1 is an exterior view in perspective of the preferred form of my invention.
Figure 2:
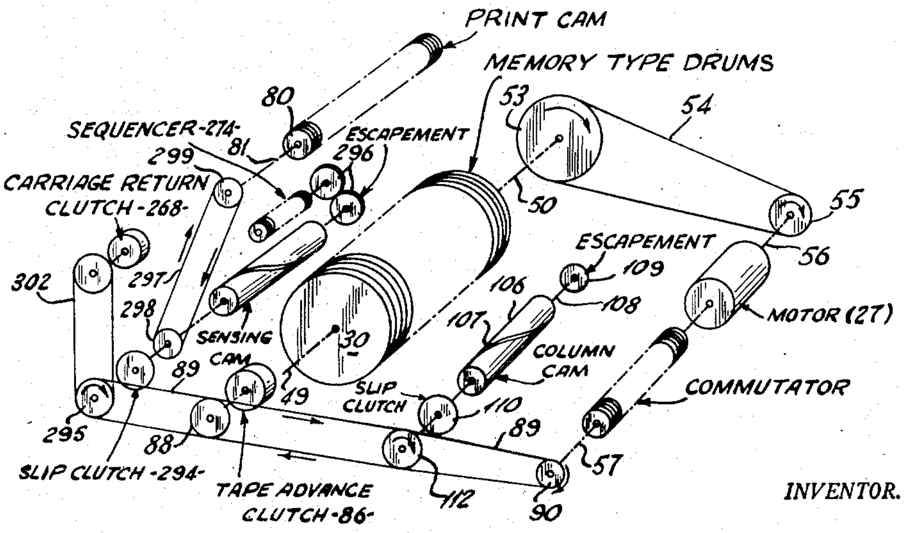
Fig. 2 is a schematic diagram showing the distribution of mechanical power from the motor to the type drums, commutators, column cam, sensing cam, hammer cam, tape advance, carriage return and sequencer.
Figure 3:
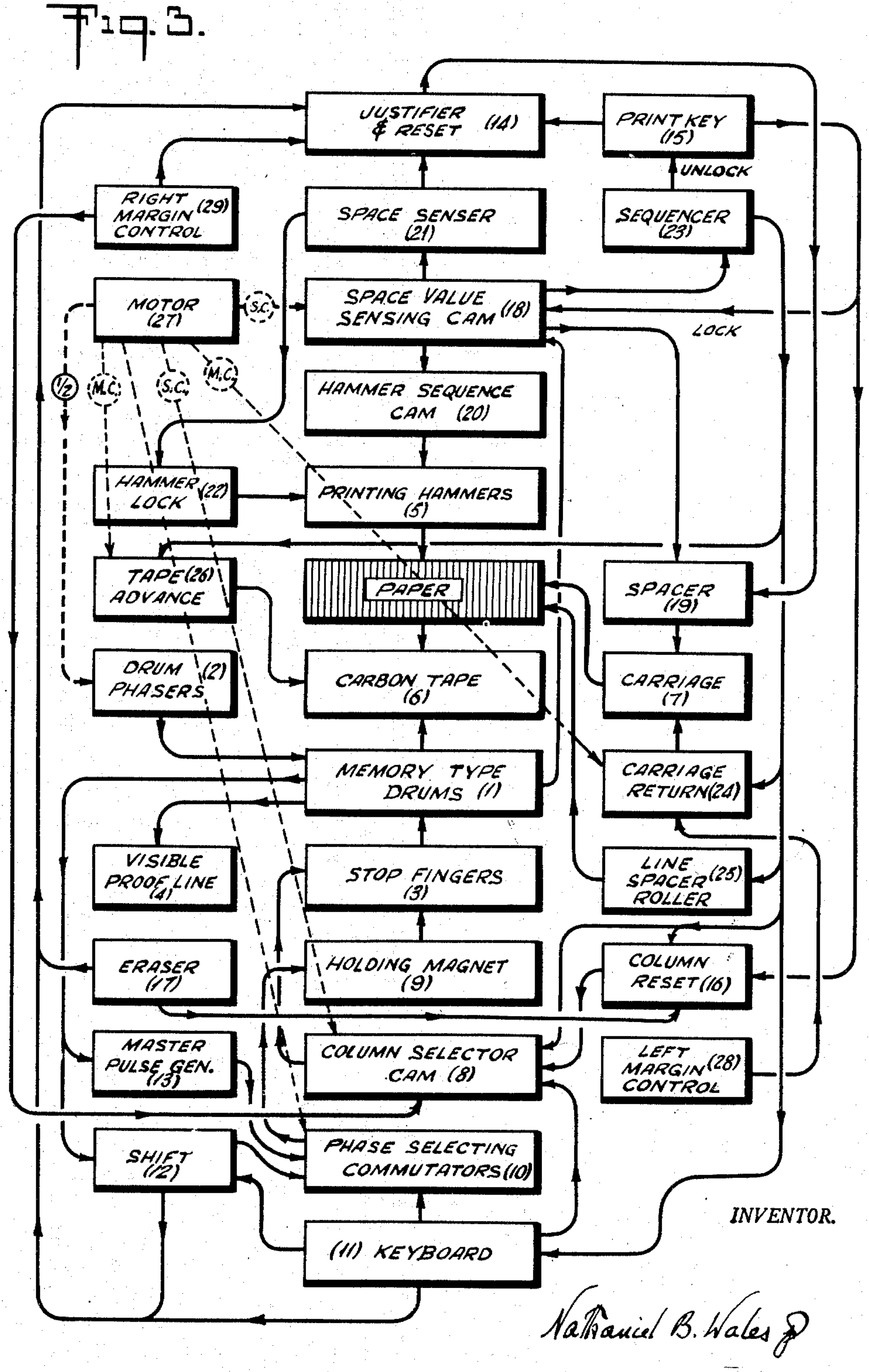
Fig. 3 is the schematic block diagram showing the functional interrelation of the twenty-nine principal elements of my invention.

The overall operation of my invention may be followed by reference to the box diagram of Fig. 3:

Depression of a key on keyboard 11 enables the corresponding phase selecting commutator 10 to send a negative pulse to holding magnet 9 thereby releasing any stop finger 3 which is not being restrained by column selector cam 8. Simultaneously, the space width value of the selected character is transmitted to the active justifier memory 14. Meanwhile, those type memory drums 1 corresponding to the unreleased stop fingers are rotating in exact phase relation to commutators 10 by virtue of drum phasing mechanism 2 driven by motor 27. Consequently, on release of the next eligible stop finger 3 by holding magnet 9 it will enter the designated tooth of drum 1 and bring it to rest by means of its shock-absorbing spring and linkage. The selected character then appears in proof window 4, and the column cam is permitted to advance one step thereby mechanicaly releasing the next stop finger for registration at the next negative magnetic pulse. The approximate pulse phase of the selected character is determined by commutators 10 whereas the exact phase is determined by the parallel action of master pulser 13. When it is desired to register an upper case letter for a given keyboard selection, the shift key 12 electrically determines in which half of the type drums 1 the selection by commutators 10 will be made. This keyboard selection continues, thereby bringing to rest a sequence of drums whereby to compose a line of type which progressively appears in unjustified form along proof window 4. If the typist wishes to erase a line before printing, key 17 is actuated, which releases the drums which have been stopped, and wipes out the active justifier memory of the accumulated type widths. Thus the typist may retype the corrected line. When the line has been composed and proof-read in the window 4, the print key 15 is actuated. This momentarily disables the keyboard 11 and erase key 17, and turns the total width information in the justifier memory 14 over for access to the printing and character sensing system. The programming of the printing operation is accomplished by the sequencer 23. The latter first starts the interlocked step-by-step progression of the space value sensing cam 18 and the hammer sequence cam 20. The sequencer 23 also returns the column cam 8 to its home position by means of reset device 16 and also stops at "space" registration any drums which have not been used in the composition of the line.

The hammer sequence cam 20 then prints the first selected character by allowing the first printing hammer 5 to fall on the paper 82 thereby forcing it against the carbon tape 6 and the selected type character of the first memory drum 1. The first sensing finger of cam 18, having moved radially inward next to the first drum until it struck the pin on the edge of this drum whose position is proportional to the typographical width of the first selected character, then selects one of four circuits corresponding to this width, and after the above first printing, pulses the selected circuit, thereby causing the spacer 19 to displace the carriage by the selected amount. This first sensing finger then withdraws, and the second hammer 5 is allowed to fall by cam 20, thus printing the second selected character of the line.

This process continues at the rate of fifteen characters per second, until a typographical space between words of the composed line is encountered. When this happens, the space senser 21 (receiving its information through a sensing finger of cam 18 in terms of the corresponding position on a drum of a space value pin) first, actuates the hammer lock 22 before the hammer falls on that drum, thereby diverting the impact from the paper, and secondly, interrogates the justifier 14 as to whether justification has been achieved. If the line is already justified, the justifier 14 causes the spacer 19 to move the carriage 7 two units representing normal spacing. However, if the line is not justified, the spacer 19 is given four units of spacing and simultaneously the justifier subtracts the extra two units from its registration of the justification deficit of the composed line. This process of printing and spacing continues until the justifier, by accumulatively subtracting the increment which it has given the spacer from the deficit, registers the fact that the justification deficit has been completely absorbed. Any subsequent space interrogations delivered to the justifier by the space senser 21 during the remainder of the printing of the line will elicit a command to the spacer for two units representing a normal space. Provision is made in the justifier to shift its increments from two extra units to one extra unit when the deficit has been reduced to one unit.

In the meanwhile, the sequencer 23, after each of the first ten printing hammers falls, causes the column selector cam 8 to progress one of its eighty steps (representing eighty columns or characters in the line) thereby camming the stop fingers 3 of the first ten drums 1 into reengagement with magnet 9 and allowing phaser 2 to bring these corresponding first ten left-hand drums up to synchronized and phased speed of rotation. This process takes place in under a second's time. At the end of this brief pause, and while the rest of the printing and spacing continues to its end, the sequencer 23 re-enables the keyboard 11 thereby permitting the typist to begin composing the next line.

When cams 18 and 20 have completed the printing operation, the sequencer advances the paper roller 25, actuates the carriage return 24 and the tape advance mechanism 26, unlocks the eraser 17 and print key 15, and finally turns itself off.

A left-margin control 28 is provided whereby the carriage return mechanism stops at any desired point, and a right-margin control 29 is provided whereby the justifier disables the keyboard beyond an adjustable stop which determines where the composed line will be justified.

Fig. 14 represents an alternative circuit and design of the keyboard, phase selecting commutators, master pulser, shift key and release magnet. This circuit is based on positive pulses instead of negative pulses. The keyboard switches 134 and 135 are identical in design and function to those of Fig. 5, however, switches 348 are normally open switches, in contradistinction to the normally closed switches 133. Also, the commutators 346 are non-conductive except at one phase point at their periphery, that is, as shaft 57 rotates, the switches formed by commutators 346 and brushes 347 close in sequence at 4½° intervals. Consequently, when a key 348 is actuated, a pulse will be applied to lead corresponding to the phase of the selected character. This pulse is made more precise, as before, in master pulser 166 and then passes through the shift commutator 166 which disables the pulses during the selected one-half revolution of the drum shaft 42. On emerging from the shift switch 161, this grounding pulse is applied to winding 350 on release magnet 62. Magnet 62, however, is also supplied with an equal and opposing winding 349 which is continuously energized. Consequently, the positive momentary energization of winding 350 results in a cancellation of the net field of magnet 62, thus achieving the same release control function as before, but utilizing positive instead of negative pulses.

Fig. 18 illustrates the schematic breakdown of my invention into sub-assemblies using printed circuit fabrication for the keyboard. It is to be noted that in the complete machine only a few wires are required to interconnect the seven basic sub-assembly chasses.

I claim:

1. In a typewriter, the combination comprising a plurality of type drums, means to position said drums whereby to form a selected line of type therefrom, a plurality of printing hammers registering with the type characters of said line of type, a paper-bearing carriage, guide means for permitting linear motion of said carriage parallel to said line of type, means to actuate said printing hammers in sequence, and means to move said carriage on said guide means during the intervals between said hammer actuations in the direction of printing progression by an amount proportional to the typographical width of the character last printed.

2. In a typewriter according to claim 1, means actuated by said type drums for forming a visible display of said selected line of type prior to the printing of said line.

3. In a typewriter according to claim 1, means for disabling the printing stroke of any of said hammers registering with a character designated "space" on any of said type drums.

4. In an automatically-justifying typewriter, the combination comprising a keyboard, a plurality of type drums, means responsive to the actuation of a sequence of keys on said keyboard for positioning said plurality of type drums in corresponding sequence whereby to form a line of selected type on said type drums, a plurality of printing hammers registering with the type characters of said line of type, a paper-bearing carriage, guide means for permitting linear motion of said carriage parallel to said line of type, a print control, a movable integrating memory register adapted to undergo a displacement on the actuation of each keyboard key proportional to the typographical width of the character corresponding to the actuated key, means responsive to the actuation of said print control to actuate said printing hammers in sequence, spacing means for moving said carriage on said guide means during the interval between said hammer actuations by either of two different selectable amounts of displacement, space-sensing means responsive to the actuation of one of said hammers over the character designated "space" on any type drum for displacing said memory register a predetermined incremental amount and for actuating said carriage spacing means, and means for selecting the greater value of said carriage spacing for spaces which occur before a predetermined value of displacement of said memory register has been reached and for selecting the lesser value of said carriage spacing for spaces occurring after the said predetermined value of displacement of said memory register has been reached.

5. In a typewriter according to claim 4, means for disabling the printing stroke of any of said hammers registering with a character designated "space" on any of said type drums.

6. In a typewriter according to claim 4, means actuated by said type drums for forming a visible display of said selected line of type prior to the printing of said line.

7. In a typewriter according to claim 4, a second movable memory register, and means responsive to the actuation of said print control for reciprocally interchanging between the first and said second memory registers the incoming said displacement impulses from the said keyboard and from the said sensing means whereby to permit overlap between the functions of line selection and printing.

8. In a typewriter according to claim 4, additional means to move said carriage on said guide means during the interval between said hammer actuations in the direction of printing progression by an amount proportional to the typographical width of the character last printed.

9. In a printing device the combination comprising a plurality of coaxial adjacent type drums each bearing an identical font of type characters on its periphery, a plurality of depressed areas intervening between the said type characters on the periphery of said drums, a plurality of visible display characters located on said depressed areas, each of said display characters corresponding to a type character on its own drum uniformly displaced therefrom, a window adapted to view a selected line of said display characters, impositive phasing means to rotate said drums in constant common phase relation to said phasing means, a plurality of stationary stop fingers each adapted to engage one of said depressed areas between the type characters on the periphery of said drums whereby to bring to rest its drum, magnetic means common to all said stop fingers for restraining their engagement with said type drums, cam means for positively mechanically restraining and disengaging a predetermined number of said stop fingers from engagement with said type drums, a keyboard, a plurality of pulse generators each adapted to generate a pulse at a fixed phase with respect to the phase of a particular type character on the periphery of those commonly phased drums which are rotating, a plurality of keys on said keyboard each adapted when actuated to connect the pulses generated by one of said pulse generators to said magnetic means whereby to disable the magnetic restraint of said magnetic means at the phase instant of the said key-selected pulses, means to advance said cam means after each said actuation of a key whereby one stop finger adjacent to the predetermined number of disengaged stop fingers is removed from mechanical restraint, and means to print the stationary type line thus selected.

10. In a printing device the combination comprising a plurality of coaxial adjacent type drums each bearing an identical font of type characters on its periphery, a plurality of depressed areas intervening between the said type characters on the periphery of said drums, a plurality of visible display characters located on said depressed areas, each of said display characters corresponding to a type character on its own drum uniformly displaced therefrom, a window adapted to view a selected line of said display characters, impositive phasing means to rotate said drums in constant common phase relation to said phasing means, a plurality of stop members, a plurality of stationary stop fingers each adapted to engage one of said stop members whereby to bring to rest its drum, magnetic means common to all said stop fingers for restraining their engagement with said type drums, cam means for positively mechanically restraining and disengaging a predetermined number of said stop fingers from engagement with said type drums, a keyboard, a plurality of pulse generators each adapted to generate a pulse at a fixed phase with respect to the phase of a particular type character on the periphery of those commonly phased drums which are rotating, a plurality of keys on said keyboard each adapted when actuated to connect the pulses generated by one of said pulse generators to said magnetic means whereby to disable the magnetic restraint of said magnetic means at the phase instant of the said key-selected pulses, means to advance said cam means after each said actuation of a key whereby one stop finger adjacent to the predetermined number of disengaged stop fingers is removed from mechanical restraint, and means to print the stationary type line thus selected.

11. In a typewriter, the combination comprising a plurality of adjacent type drums, means to position said type drums to form a line of type, a corresponding plurality of printing hammers aligned with the characters and spaces of said line of type, means for actuating the said hammers in sequence to impact a work sheet positioned between said hammers and said line of type, and means responsive to the presence of a typographical space under any hammer for disabling its ability to impact said work sheet.

12. In a machine for printing typographical characters, means for composing and positioning in space an unjustified line of type, means for printing the characters of said line of type in sequence on a work sheet, and means for causing relative motion between said work sheet and said line of type whereby to justify the printed representation of said line of type between the sequential operations of said printing means.

13. In a machine for printing typographical characters having different widths, means for composing and positioning in space a line of type without respect to the widths of said characters, means for printing the characters of said line of type in sequence, and means for causing relative motion between a work sheet and said line of type between the sequential operations of said printing means whereby to space the printed representation of the characters of said line of type in accordance with their individual typographical widths.

References Cited in the file of this patent

UNITED STATES PATENTS

| | | |
|---|---|---|
| 562,563 | Allen | June 23, 1896 |
| 584,364 | Johnson | June 15, 1897 |
| 626,098 | Risley et al. | May 30, 1899 |
| 2,047,505 | Hausheer | July 14, 1936 |